US010380894B2

(12) United States Patent
Sawato et al.

(10) Patent No.: US 10,380,894 B2
(45) Date of Patent: Aug. 13, 2019

(54) INFORMATION NOTIFICATION DEVICE, INFORMATION NOTIFICATION SYSTEM, INFORMATION NOTIFICATION METHOD, AND INFORMATION NOTIFICATION PROGRAM

(71) Applicant: HONDA MOTOR CO., LTD., Tokyo (JP)

(72) Inventors: Hiroaki Sawato, Tokyo (JP); Atsuki Kakinuma, Tokyo (JP); Takeo Tokunaga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/032,955

(22) PCT Filed: Oct. 31, 2014

(86) PCT No.: PCT/JP2014/079089
§ 371 (c)(1),
(2) Date: Apr. 28, 2016

(87) PCT Pub. No.: WO2015/064745
PCT Pub. Date: May 7, 2015

(65) Prior Publication Data
US 2016/0253905 A1 Sep. 1, 2016

(30) Foreign Application Priority Data

Oct. 31, 2013 (JP) ................................. 2013-227471
Oct. 3, 2014 (JP) ................................. 2014-205205

(51) Int. Cl.
*G08G 1/09* (2006.01)
*G08G 1/16* (2006.01)
*H04W 4/04* (2009.01)

(52) U.S. Cl.
CPC ............. *G08G 1/161* (2013.01); *G08G 1/091* (2013.01); *G08G 1/162* (2013.01); *G08G 1/163* (2013.01); *H04W 4/046* (2013.01)

(58) Field of Classification Search
CPC ........ G08G 1/161; G08G 1/091; G08G 1/162; G08G 1/163; H04W 4/046
See application file for complete search history.

(56) References Cited

U.S. PATENT DOCUMENTS 1,448,854 A * 3/1923 Martin .................... E04G 11/52
52/645
1,856,600 A * 5/1932 Thomas ................. H01H 37/60
200/407

(Continued)

FOREIGN PATENT DOCUMENTS

JP 07-055941 3/1995
JP 2000-348299 12/2000

(Continued)

OTHER PUBLICATIONS

Japanese Office Action dated Feb. 7, 2017, 4 pages.
International Search Report, dated Feb. 3, 2015 (Feb. 3, 2015).

*Primary Examiner* — Joseph H Feild
*Assistant Examiner* — Rufus C Point
(74) *Attorney, Agent, or Firm* — Rankin, Hill & Clark LLP

(57) ABSTRACT

Provided is an information notification device (10) utilizing presence information which includes a processing unit (11) to generate, according to trigger information, at least one presence information (MESSAGE 10, MESSAGE 20, MESSAGE 30) between a first moving body (a four-wheeled vehicle (200)), and a second moving body (a two-wheeled vehicle (300) or a riding electric cart (300)), and a transmitting unit (16) which transmits the presence information to both of the four-wheeled vehicle (200) and the two- (Continued)

wheeled vehicle or the electric cart (300). The presence information is, for example, first presence information (MESSAGE 20) and second presence information (MESSAGE 30). The second presence information (MESSAGE 30) can cause a second processing unit (31) of the electric cart (300) to identify another presence information (34-5) representing the presence of the four-wheeled vehicle (200) around the electric cart (300) based on the second presence information (MESSAGE 30).

5 Claims, 10 Drawing Sheets

(56) References Cited

U.S. PATENT DOCUMENTS

| | | | | |
|---|---|---|---|---|
| 1,921,563 | A * | 8/1933 | Cottrell | C01B 7/09 210/714 |
| 6,647,270 | B1 * | 11/2003 | Himmelstein | G06Q 10/10 455/456.1 |
| 6,734,356 | B1 * | 5/2004 | Gretz | F04D 25/088 174/50 |
| 7,743,033 | B2 * | 6/2010 | Patel | G06F 11/1076 707/636 |
| 8,520,695 | B1 * | 8/2013 | Rubin | G08G 9/02 370/445 |
| 9,046,374 | B2 * | 6/2015 | Ricci | H04W 4/90 |
| 2004/0026947 | A1 * | 2/2004 | Kitano | B60R 7/04 296/24.34 |
| 2004/0230373 | A1 * | 11/2004 | Tzamaloukas | G01C 21/28 701/468 |
| 2009/0027168 | A1 * | 1/2009 | Tuttle | H04B 5/00 340/10.2 |
| 2009/0085770 | A1 * | 4/2009 | Mergen | B60O 5/008 340/904 |
| 2009/0278688 | A1 * | 11/2009 | Tuttle | G06K 7/10346 340/572.2 |
| 2010/0214085 | A1 * | 8/2010 | Avery | G08G 1/161 340/435 |
| 2012/0133483 | A1 * | 5/2012 | Zatloukal | G06K 7/0008 340/5.7 |
| 2014/0031010 | A1 * | 1/2014 | Wuergler | H04W 76/10 455/418 |
| 2014/0063064 | A1 * | 3/2014 | Seo | G08G 1/166 345/633 |
| 2015/0170429 | A1 * | 6/2015 | Denny | B60W 30/09 701/36 |
| 2016/0127295 | A1 * | 5/2016 | Karimli | H04W 4/046 709/206 |
| 2017/0120906 | A1 * | 5/2017 | Penilla | G05D 1/0011 |

FOREIGN PATENT DOCUMENTS

| | | |
|---|---|---|
| JP | 2004-248084 | 9/2004 |
| JP | 2009-104230 | 5/2009 |
| JP | 2011-204151 | 10/2011 |
| JP | 2011-221573 | 11/2011 |
| JP | 2012-048645 | 3/2012 |

* cited by examiner

FIG.2A
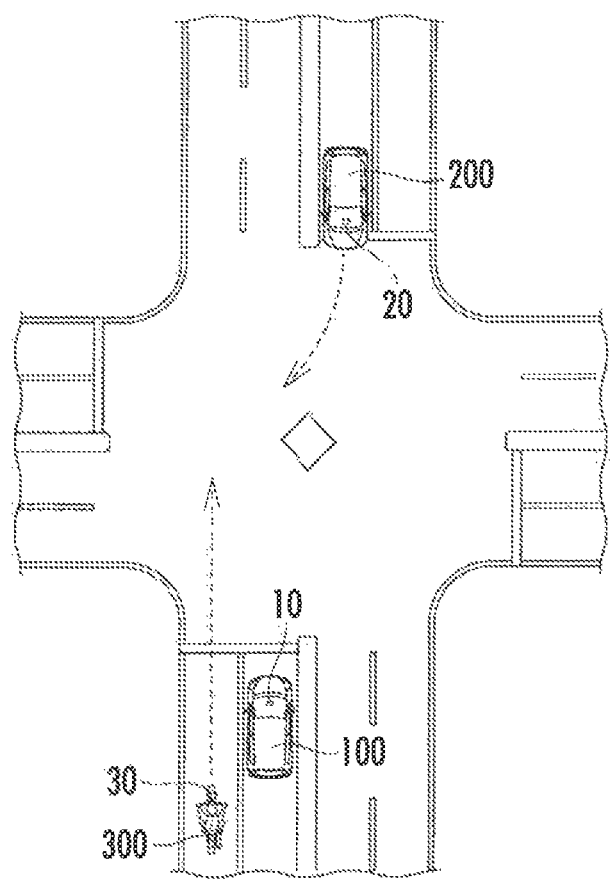
FIG.2B
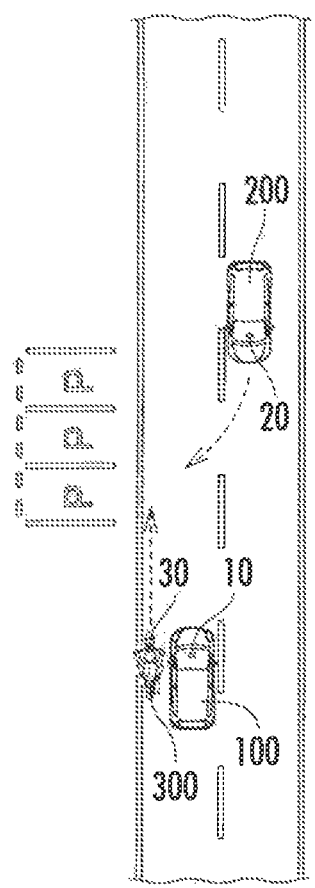
FIG.3
| ID10 | STATE10 | CLASS20 | CLASS30 | MESSAGE10 |

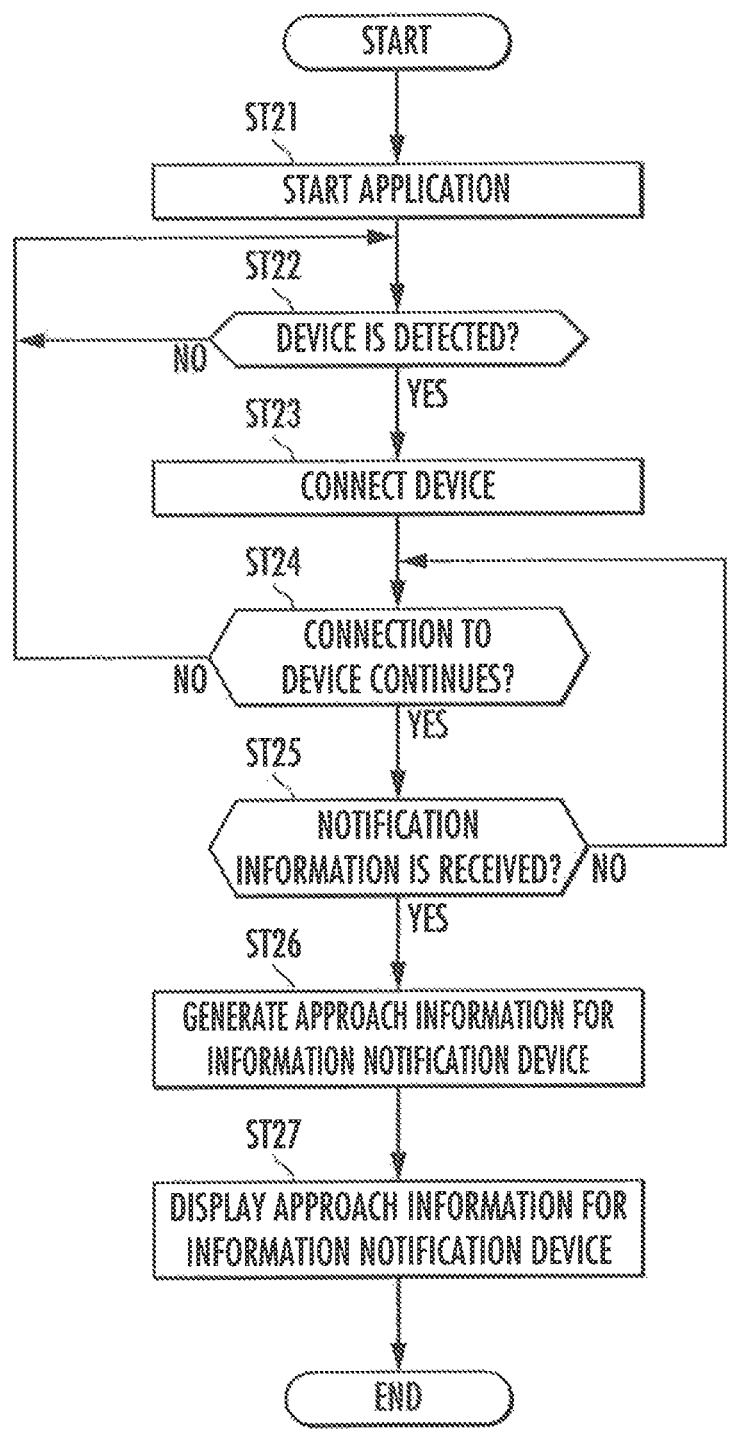

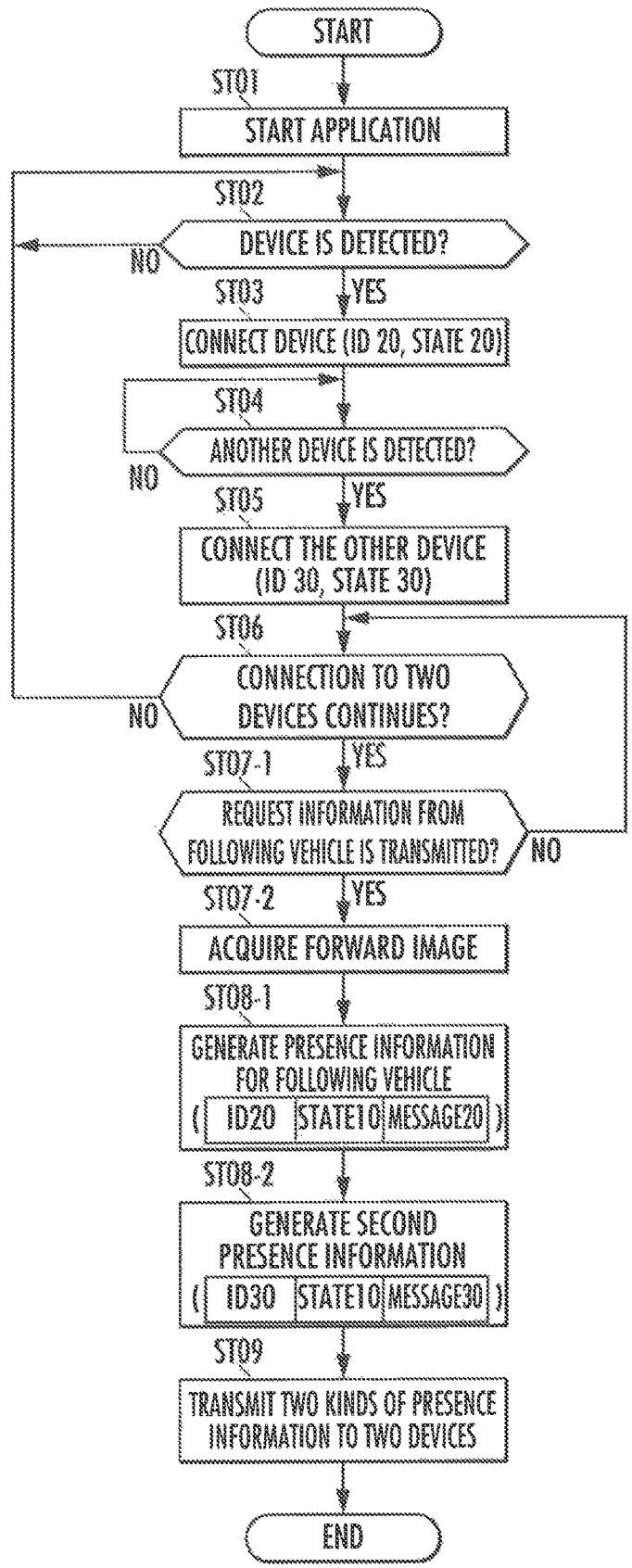

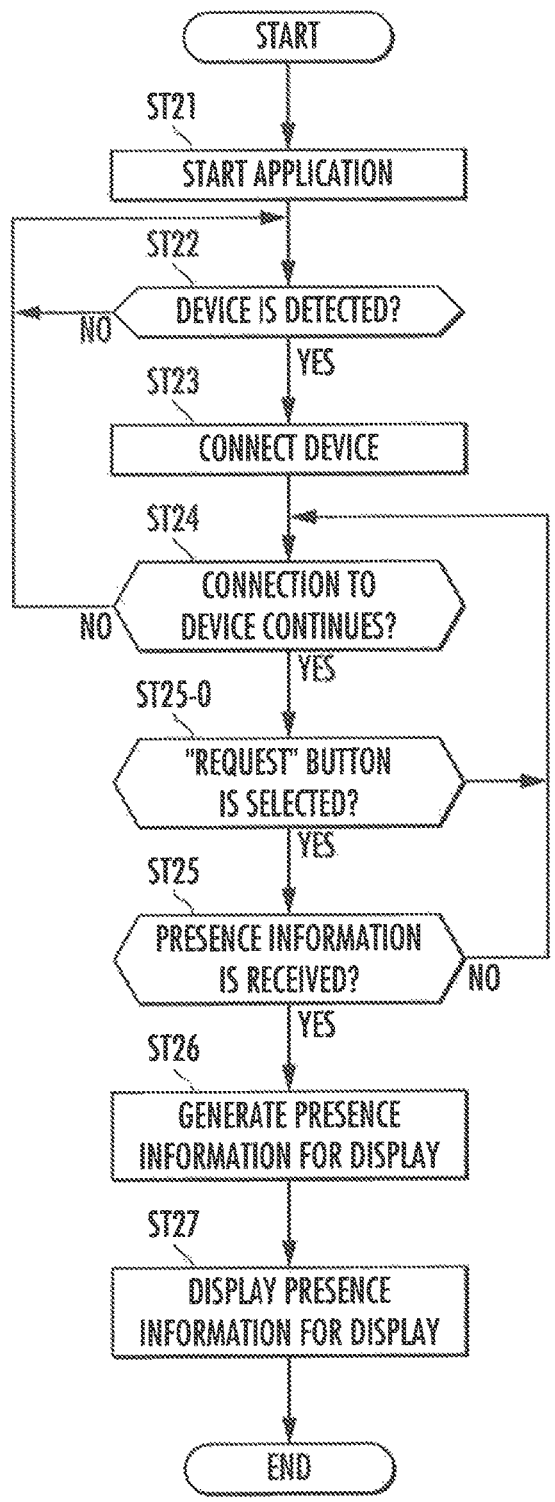 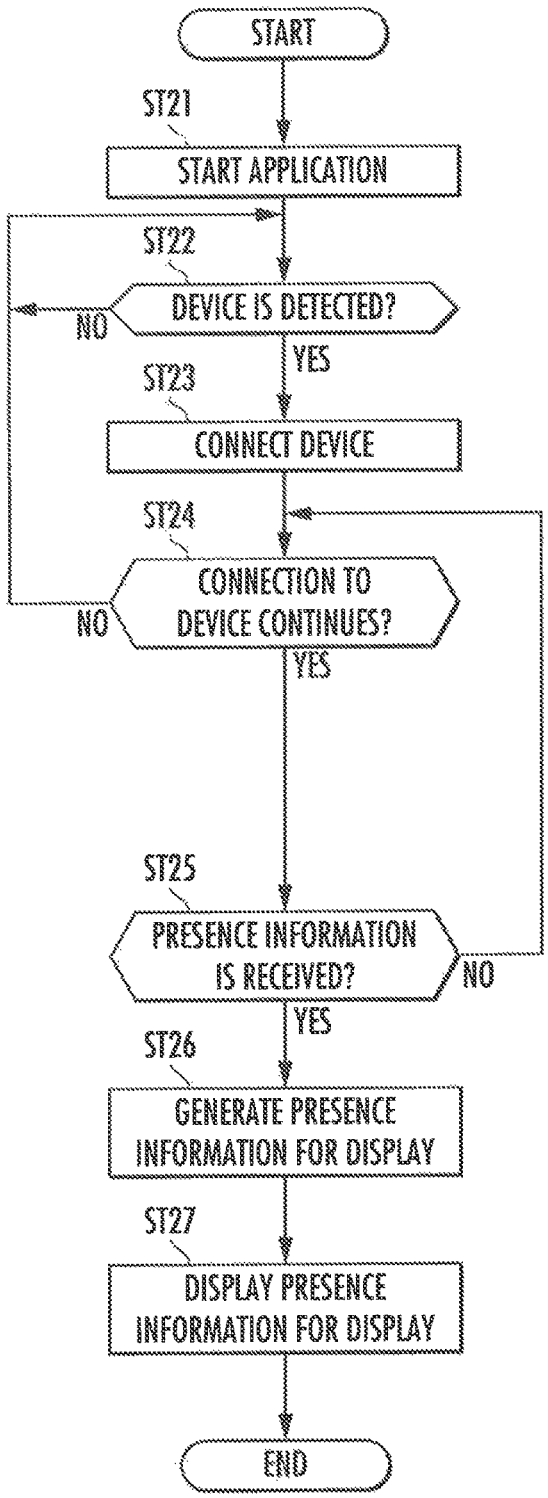

INFORMATION NOTIFICATION DEVICE, INFORMATION NOTIFICATION SYSTEM, INFORMATION NOTIFICATION METHOD, AND INFORMATION NOTIFICATION PROGRAM

TECHNICAL FIELD

The present invention relates to a device (an information notification device) that notifies other devices of presence information such as traffic information concerning approach of a first moving body and a second moving body (for example, approach information representing a traffic situation in which a four-wheeled vehicle and a two-wheeled vehicle approach), a system (an information notification system) including the information notification device and other devices, a method (an information notification method) for actuating the information notification device, and a program (an information notification program) for executing the information notification method.

BACKGROUND ART

For example, Japanese Patent Application Laid-Open No. 2009-104230 discloses a man (pedestrian)-to-vehicle communication system including a vehicle-mounted communication device provided in a vehicle and a cellular phone device carried by a pedestrian. Other vehicles also include vehicle-mounted communication devices. A man (pedestrian)-to-vehicle communication system further including the vehicle-mounted communication devices of the other vehicles can be called a vehicle-to-vehicle and man (pedestrian)-to-vehicle communication system.

Drawings of Japanese Patent Application Laid-Open No. 2009-104230 show, for example, a configuration example of vehicle traveling information transmitted from vehicles such as a vehicle and other vehicles. The vehicle traveling information includes, for example, "own vehicle ID", which is a number for specifying the vehicle or another vehicle, "vehicle type", which is a type of the vehicle or the other vehicle, "latitude", "longitude", and "altitude" where the vehicle or the other vehicle is located, and "vehicle speed". "acceleration", "direction", "brake", and "accelerator" for specifying an operation state of the vehicle or the other vehicle. Similarly, the drawings of Japanese Patent Application Laid-Open No. 2009-104230 show, for example, a configuration example of pedestrian information transmitted from a cellular phone device or, for example, a pedestrian. The pedestrian information includes, for example, "portable ID", which is a number for specifying the cellular phone device, "latitude" and "longitude" where the pedestrian is located, and "direction", which is a moving direction of the pedestrian.

The drawings of Japanese Patent Application Laid-Open No. 2009-104230 show, for example, a configuration example of output information by a display and a speaker configuring an output unit of the vehicle. When the vehicle traveling information is transmitted, for example, from the other vehicle to the vehicle, the display of the vehicle can output display as the position of the other vehicle. Alternatively, when the pedestrian information is transmitted, for example, from the pedestrian to the vehicle, the display of the vehicle can output display as the position of the pedestrian. According to Japanese Patent Application Laid-Open No. 2009-104230, a navigation control unit of the vehicle can determine whether or not the distance between the position of the vehicle and the position of the other vehicle is equal to or smaller than a predetermined value and whether or not the other vehicle is approaching the vehicle. The speaker of the vehicle can output sound "a vehicle is approaching from behind".

In this way, the vehicle-mounted communication device of the vehicle can acquire the position of the other device from the other device such as the vehicle-mounted communication device of the other vehicle or the other device such as the cellular phone device of the pedestrian and determine whether or not approach information such as "a vehicle is approaching from behind" is output.

For example, Japanese Patent Application Laid-Open No. 2000-348299 discloses a mobile communication device. A transceiver of the mobile communication device can transmit, to another device, situation data including a position, a traveling direction, an intersection ahead, and a reaching time to the intersection ahead of a vehicle mounted with the mobile communication device. The transceiver can receive, from the other device, situation data (a position, a traveling direction, an intersection ahead, a reaching time to the intersection ahead, and the like) of another vehicle mounted with the other device.

A controller of Japanese Patent Application Laid-Open No. 2000-348299 is mounted on, for example, the vehicle. The controller of the vehicle can estimate whether or not both of the vehicle and, for example, the other vehicle substantially simultaneously reach, for example, the vicinity of an intersection and determine whether or not approach information such as a warning is notified.

SUMMARY OF INVENTION

Both of Japanese Patent Application Laid-Open No. 2009-104230 and Japanese Patent Application Laid-Open No. 2000-348299 disclose that both of the vehicles approaching each other determine the approach of the vehicles each other with communication means. In this way, in Japanese Patent Application Laid-Open No. 2009-104230 and Japanese Patent Application Laid-Open No. 2000-348299, a traffic situation representing both of the vehicles approaching each other is only used. The inventor recognized that information from vehicles other than such both of the vehicles can be used. That is, the inventor recognized that, if the vehicles other than both of the vehicles approaching each other include communication means, such vehicles can also transmit information.

An object of the present invention is to provide an information notification device, an information notification system, an information notification method, and an information notification program that can utilize presence information representing the presence of at least one of people concerned. Other objects of the present invention will be clarified by referring to aspects and best embodiments illustrated below and accompanying drawings.

Aspects according to the present invention are described below in order to easily understand an overview of the present invention.

In a first aspect, an information notification device includes:

a processing unit configured to generate, according to trigger information, at least one presence information between a first moving body (for example, a four-wheeled vehicle) and a second moving body (for example, a riding electric cart or a two-wheeled vehicle); and a transmitting unit configured to transmit the at least one presence information to both of the first moving body and the second moving body, wherein the at least one presence information is capable of causing a second processing unit of the second moving body (the electric cart or the two-wheeled vehicle) to identify another presence information representing the presence of the first moving body (the four-wheeled vehicle) around the second moving body based on the at least one presence information.

When the information notification device including the processing unit configured to generate the at least one presence information between both of the first moving body and the second moving body is not mounted on both of the first moving body and the second moving body approaching each other, the transmitting unit of the information notification device can transmit the at least one presence information. In other words, when the information notification device is mounted on a vehicle (for example, a four-wheeled vehicle, or, for example, a commercial vehicle, or, for example, a large four-wheeled vehicle, or, for example, a bus) other than the first moving body (for example, the four-wheeled vehicle) and the second moving body (for example, the electric cart) approaching each other, the vehicle (for example, the bus) other than both of the vehicles approaching each other can generate presence information representing the presence of at least one (for example, the four-wheeled vehicle) of both of the vehicles approaching each other and transmit the presence information to at least the other (for example, the electric cart) of both of the vehicles. In this way, the information notification device can utilize the presence information.

Alternatively, when an information notification device is mounted on a vehicle (for example, a four-wheeled vehicle) other than the first moving body (for example, the four-wheeled vehicle) and the second moving body (for example, the two-wheeled vehicle) approaching each other, a user of the information notification device (an outsider other than both of drivers of the first moving body and the second moving body approaching each other (people concerned)) causes the information notification device to generate presence information such as approach information and transmit the presence information such as the approach information to both of the four-wheeled vehicle and the two-wheeled vehicle. In this way, the information notification device can utilize the presence information.

In a second aspect dependent from the first aspect, the at least one presence information may include first presence information and second presence information, the transmitting unit may transmit the first presence information to the first moving body and transmit the second presence information to the second moving body, and the second presence information may cause the second processing unit of the second moving body to identify the other presence information based on the second presence information.

When the information notification device is mounted on a vehicle (for example, a four-wheeled vehicle, or, for example, a commercial vehicle, or, for example, a large four-wheeled vehicle, or, for example, a bus) other than the first moving body (for example, the four-wheeled vehicle) and the second moving body (for example, the electric cart) approaching each other, the vehicle (for example, the bus) other than both of the vehicles approaching each other can generate presence information (second presence information) representing the presence of at least one (for example, the four-wheeled vehicle) of both of the vehicles approaching each other and transmit the presence information to at least the other (for example, the electric cart) of both of the vehicles. The vehicle (for example, the bus) other than both of the vehicles approaching each other can generate presence information (first presence information) representing the presence of at least the other (for example, the electric cart) of both of the vehicles approaching each other and transmit the presence information to at least one (for example, the four-wheeled vehicle) of both of the vehicles.

In a third aspect dependent from the second aspect, the first presence information may be an image, and the image may cause a first processing unit of the first moving body to execute display of the image in an informing unit of the first moving body.

At least one (for example, the four-wheeled vehicle) of both of the vehicles approaching each other can cause the first processing unit to display the image (the first presence information) representing the presence of at least the other (for example, the electric cart) of both of the vehicles approaching each other.

In a fourth aspect depending from any one of the first to third aspects, the information notification device may further include a receiving unit configured to receive, as the trigger information, request information from at least one of the first moving body and the second moving body, and the processing unit may generate the at least one presence information according to the request information.

A request from at least any one (for example, the four-wheeled vehicle) and/or the other (for example, the electric cart) of both of the vehicles approaching each other configures a trigger. Presence information (at least one presence information or second presence information) representing the presence of at least one (for example, the four-wheeled vehicle) of both of the vehicles approaching each other is generated according to the trigger.

In a fifth aspect dependent from the first aspect, the at least one presence information may be common presence information.

In the fifth aspect, specifically, the information notification device includes:

a processing unit configured to generate common presence information such as approach information between the first moving body (for example, the four-wheeled vehicle) and the second moving body (for example, the two-wheeled vehicle); and a transmitting unit configured to transmit the common presence information such as the approach information to both of the first moving body (the four-wheeled vehicle) and the second moving body (the two-wheeled vehicle), the processing unit adds both of first identification information and second identification information to the common presence information such as the approach information, the first identification information is capable of causing a first processing unit of the first moving body (the four-wheeled vehicle) to convert the common presence information such as the approach information into first presence information such as first approach information from the second moving body (the two-wheeled vehicle) to the first moving body (the four-wheeled vehicle), and the second identification information is capable of causing the second processing unit of the second moving body (the two-wheeled vehicle) to convert the common presence information such as the approach information into second presence information (another presence information) such as second approach information from the first moving body (the four-wheeled vehicle) to the second moving body (the two-wheeled vehicle).

For example, as in the vehicle-mounted communication device of Japanese Patent Application Laid-Open No. 2009-104230 and the controller of Japanese Patent Application Laid-Open No. 2000-348299, traffic information concerning approach of the first moving body and the second moving body, for example, common presence information such as approach information between the four-wheeled vehicle and the two-wheeled vehicle can also be generated by a processing unit of the four-wheeled vehicle itself or the two-wheeled vehicle itself. However, for example, before a point in time when the processing unit of the four-wheeled vehicle itself generates the approach information, a driver (an observer) or a passenger (an observer) of a third moving body other than the four-wheeled vehicle (the first moving body) and the two-wheeled vehicle (the second moving body), a pedestrian (an observer) located near the four-wheeled vehicle (the first moving body) or the two-wheeled vehicle (the second moving body), or the like is sometimes aware of the common presence information such as the approach information. When such an observer (an outsider other than people concerned) is the user of the information notification device, the information notification device can generate the common presence information such as the approach information and transmit the common presence information such as the approach information to both of the four-wheeled vehicle and the two-wheeled vehicle.

The transmitting unit of the information notification device includes first identification information and second identification information, which are information concerning both of the four-wheeled vehicle (the first moving body) and the two-wheeled vehicle (the second moving body) approaching each other, in the common presence information such as the approach information and transmits the first identification information and the second identification information. Consequently, the observer (the outsider other than the people concerned) can transmit these kinds of information without involving complicated operation.

Each of the four-wheeled vehicle (the first moving body) and the two-wheeled vehicle (the second moving body), which receive these kinds of information, can also select necessary information and inform of or output the presence information (the first presence information or the second presence information) such as the approach information. Consequently, for example, the driver (the person concerned) of the four-wheeled vehicle (the first moving body) and, for example, the driver (the person concerned) of the two-wheeled vehicle (the second moving body) can receive the approach information without involving complicated operation.

In a sixth aspect dependent from the fifth aspect, the trigger information may be operation information.

In the sixth aspect, specifically, the information notification device may further include an operation unit capable of receiving the operation information from a user, and the processing unit may generate the common presence information such as the approach information according to the operation information.

The user (an observer) present in a position more desirable than the position of the four-wheeled vehicle (the first moving body) and the position of the two-wheeled vehicle (the second moving body) sometimes can more quickly predict a traffic situation immediately after the present time. Specifically, the user (the observer) present in the desirable position sometimes desires to instantaneously predict that the four-wheeled vehicle and the two-wheeled vehicle will approach more than the four-wheeled vehicle and the two-wheeled vehicle is approaching now and immediately notify the awareness to both of the four-wheeled vehicle (the first moving body) and the two-wheeled vehicle (the second moving body) approaching each other. At this point, the information notification device of the user (the observer) present in the desirable position includes the first identification information and the second identification information, which are the information concerning both of the four-wheeled vehicle (the first moving body) and the two-wheeled vehicle (the second moving body) approaching each other, in the common presence information such as the approach information and transmits the first identification information and the second identification information. Consequently, the observer (the outsider other than the people concerned) can transmit these kinds of information without involving complicated operation. Each of the four-wheeled vehicle (the first moving body) and the two-wheeled vehicle (the second moving body), which receive these kinds of information, can receive and utilize these kinds of information.

In a seventh aspect dependent from the fifth aspect, the trigger information may be request information.

In the seventh aspect, specifically, the information notification device may further include a receiving unit configured to receive the request information from at least one of the first moving body and the second moving body, and the processing unit may generate the common presence information such as the approach information according to the request information.

For example, an information notification device (i.e., a machine) disposed in a third moving body can be automatically aware of possibility of approach of the first moving body to something (for example, the second moving body) according to, for example, the request information from first moving body. Taking this as an opportunity, for example, the information notification device of the third moving body can generate the common presence information such as the approach information. In other words, in the third aspect, operation by the observer is not always necessary for the generation of the approach information.

In an eighth aspect dependent from any one of the first to seventh aspects, the information notification device may be a portable terminal that can be carried into the interior of a vehicle.

Since the information notification device is configured by the portable terminal, convenience for the user of the information notification device (the portable terminal) can be improved.

In a ninth aspect dependent from any one of the first to seventh aspects, the information notification device may be a vehicle-mounted device built in a dashboard of a vehicle or in the periphery of the dashboard.

Since the information notification device is configured by the vehicle-mounted device, any user of the information notification device (the vehicle-mounted device) can use the information notification device (the vehicle-mounted device).

In the tenth aspect, an information notification system includes:

a first information notification device disposed in a first moving body (the four-wheeled vehicle) and including a processing unit of the first moving body;

a second information notification device disposed in a second moving body (the electric cart) and including a processing unit of the second moving body; and a third information notification device, which is the information notification device dependent from any one of the first to fourth aspects disposed in a third moving body (an intermediate moving body) located between the first moving body (the four-wheeled vehicle) and the second moving body (the electric cart), wherein the third information notification device receives second sender information from the second information notification device and transmits the at least one kind of presence information based on the second sender information.

When the information notification device is mounted on a vehicle (for example, a four-wheeled vehicle, or, for example, a commercial vehicle, or, for example, a large four-wheeled vehicle, or, for example, a bus) other than the first moving body (for example, the four-wheeled vehicle) and the second moving body (for example, the electric cart) approaching each other, the vehicle (for example, the bus) other than both of the vehicles approaching each other can receive the second sender information from the other (for example, the electric cart) of both of the vehicles approaching each other and transmit, on the basis of the second sender information, presence information on one (for example, the four-wheeled vehicle) of both of the vehicles approaching each other to, for example, the electric cart.

In an eleventh aspect dependent from the ninth aspect, the third information notification device may be the information notification device in the second or third aspect.

The third information notification device may receive first sender information from the first information notification device and transmit the first presence information based on the first sender information.

When the information notification device is mounted on a vehicle (for example, a four-wheeled vehicle, or, for example, a commercial vehicle, or, for example, a large four-wheeled vehicle, or, for example, a bus) other than the first moving body (for example, the four-wheeled vehicle) and the second moving body (for example, the electric cart) approaching each other, the vehicle (for example, the bus) other than both of the vehicles approaching each other can receive the first sender information from one (for example, the four-wheeled vehicle) of both of the vehicles approaching each other and transmit, on the basis of the first sender information, presence information on the other (for example, the electric cart) of both of the vehicles approaching each other to, for example, the four-wheeled vehicle.

In a twelfth aspect, an information notification system includes:

a first information notification device disposed in a first moving body (the four-wheeled vehicle) and including a processing unit of the first moving body;

a second information notification device disposed in a second moving body (the two-wheeled vehicle) and including a processing unit of the second moving body; and a third information notification device, which is the information notification device dependent from any one of the fifth to seventh aspects disposed in a third moving body (an intermediate moving body) located between the first moving body (the four-wheeled vehicle) and the second moving body (the two-wheeled vehicle), wherein the first information notification device receives the common presence information such as the approach information, the first identification information, and the second identification information from the third information notification device and, when the first moving body (the four-wheeled vehicle) corresponds to the first identification information, converts the common presence information such as the approach information into the first presence information such as the first approach information and informs of the first presence information such as the first approach information, and the second information notification device receives the common presence information such as the approach information, the first identification information, and the second identification information from the third information notification device and, when the second moving body (the two-wheeled vehicle) corresponds to the second identification information, converts the common presence information such as the approach information into the second presence information such as the second approach information and informs of the second presence information such as the second approach information.

Traffic information concerning approach of the first moving body and the second moving body, for example, the common presence information such as the approach information between the four-wheeled vehicle and the two-wheeled vehicle can also be generated by the information notification device (the first information notification device and the second information notification device) of the person concerned. However, before a point in time when the information notification device (the first information notification device and the second information notification device) of the person concerned generates the common presence information such as the approach information, the information notification device (the third information notification device) of the outsider other than the people concerned can sometimes generate the common presence information such as the approach information earlier.

In a thirteenth aspect, an information notification device includes:

a processing unit configured to generate presence information such as approach information between a first moving body (a four-wheeled vehicle) and a second moving body (a two-wheeled vehicle); and a transmitting unit configured to transmit the presence information such as the approach information to the first moving body (the four-wheeled vehicle), wherein the processing unit adds both of first identification information concerning a first type (a type of the first moving body) and second identification information concerning a second type (a type of the second moving body) to the presence information such as the approach information, the first identification information and the second identification information are respectively capable of causing a processing unit of one of the first moving body (the four-wheeled vehicle) or the second moving body (the two-wheeled vehicle) to identify the first type (the type of the first moving body) and the second type (the type of the second moving body), when a type of the one of the first moving body (the four-wheeled vehicle) and the second moving body (the two-wheeled vehicle) coincides with the first type in the first identification information, the first identification information is capable of causing the processing unit of the one of the first moving body (the four-wheeled vehicle) or the second moving body (the two-wheeled vehicle) to convert the presence information such as the approach information into first presence information indicating that the other of the first moving body (the four-wheeled vehicle) or the second moving body (the two-wheeled vehicle) is present in a periphery of the one of the first moving body (the four-wheeled vehicle) or the second moving body (the two-wheeled vehicle), and the information notification device is disposed in a third moving body located between the first moving body (the four-wheeled vehicle) and the second moving body (the two-wheeled vehicle).

For example, before a point in time when the four-wheeled vehicle (the first moving body) itself generates the presence information such as the approach information, a driver (an observer) or a passenger (an observer) of the third moving body other than the four-wheeled vehicle (the first moving body) and the two-wheeled vehicle (the second moving body) is sometimes aware of the presence information such as the approach information. When such an observer is a user of the information notification device, the information notification device can generate the presence information such as the approach information and transmit the presence information such as the approach information to the four-wheeled vehicle.

The transmitting unit of the information notification device includes the first identification information and the second identification information, which are information concerning both of the four-wheeled vehicle (the first moving body) and the two-wheeled vehicle (the second moving body) approaching each other, in the presence information such as the approach information and transmits the first identification information and the second identification information. Consequently, the observer (an outsider other than people concerned) can transmit these kinds of information without involving complicated operation. The four-wheeled vehicle (the first moving body), which receives these kinds of information, can select necessary information and inform of or output the presence information such as the approach information. Consequently, for example, the driver (the person concerned) of the four-wheeled vehicle (the first moving body) can receive the presence information such as the approach information without involving complicated operation.

In a fourteenth aspect, an information notification method includes:

generating, according to trigger information, at least one presence information between a first moving body (for example, a four-wheeled vehicle) and a second moving body (for example, a two-wheeled vehicle or an electric cart); and transmitting the at least one presence information to both of the first moving body (the four-wheeled vehicle) and the second moving body (the two-wheeled vehicle or the electric cart), wherein the at least one presence information is capable of causing a second processing unit of the second moving body to identify another kind of presence information representing the presence of the first moving body in the periphery of the second moving body based on the at least one presence information.

When an information notification device capable of executing the information notification method is mounted on a vehicle (for example, a four-wheeled vehicle, or, for example, a commercial vehicle, or, for example, a large four-wheeled vehicle, or, for example, a bus) other than the first moving body (for example, the four-wheeled vehicle) and the second moving body (for example, the electric cart) approaching each other, the vehicle (for example, the bus) other than both of the vehicles approaching each other can generate presence information representing the presence of at least one (for example, the four-wheeled vehicle) of both of the vehicles approaching each other and transmit the presence information to at least the other (for example, the electric cart) of both of the vehicles. In this way, the information notification method can utilize the presence information.

Alternatively, traffic information concerning approach of the first moving body and the second moving body, for example, at least one presence information such as approach information between the four-wheeled vehicle and the two-wheeled vehicle can also be generated by a processing unit of the four-wheeled vehicle itself or the two-wheeled vehicle itself. However, a driver (an observer) or a passenger (an observer) of a third moving body other than the four-wheeled vehicle and the two-wheeled vehicle, a pedestrian (an observer) located near the four-wheeled vehicle or the two-wheeled vehicle, or the like is sometimes aware of the at least one presence information such as the approach information. The information notification method can generate the at least one kind of presence information such as the approach information according to operation information from such an observer or automatically and transmit the at least one presence information such as the approach information to both of the four-wheeled vehicle and the two-wheeled vehicle.

A transmitting unit of the information notification device includes the first identification information and the second identification information, which are information concerning both of the four-wheeled vehicle (the first moving body) and the two-wheeled vehicle (the second moving body) approaching each other, in the at least one presence information such as the approach information and transmits the first identification information and the second identification information. Consequently, the observer (an outsider other than people concerned) can transmit these kinds of information without involving complicated operation. Each of the four-wheeled vehicle (the first moving body) and the two-wheeled vehicle (the second moving body), which receive these kinds of information, can receive and utilize these kinds of information.

In a fifteenth aspect, an information notification program is an information notification program for causing a computer to execute:

generating, according to trigger information, at least one presence information between a first moving body (for example, a four-wheeled vehicle) and a second moving body (for example, a two-wheeled vehicle or an electric cart); and transmitting the at least one presence information to both of the first moving body (the four-wheeled vehicle) and the second moving body (the two-wheeled vehicle), wherein the at least one presence information causes a second processing unit of the second moving body to identify another presence information representing the presence of the first moving body in a periphery of the second moving body based on the at least one presence information.

When an information notification device capable of executing the information notification program is mounted on a vehicle (for example, a four-wheeled vehicle, or, for example, a commercial vehicle, or, for example, a large four-wheeled vehicle, or, for example, a bus) other than the first moving body (for example, the four-wheeled vehicle) and the second moving body (for example, the electric cart) approaching each other, the vehicle (for example, the bus) other than both of the vehicles approaching each other can generate presence information representing the presence of at least one (for example, the four-wheeled vehicle) of both of the vehicles approaching each other and transmit the presence information to at least the other (for example, the electric cart) of both of the vehicles. In this way, the information notification program can utilize the presence information.

In addition, if the information notification program is an information notification program for adding the first identification information and the second identification information to at least one presence information such as approach information, a user of a computer including the information notification program can generate such information without involving complicated operation.

BRIEF DESCRIPTION OF DRAWINGS

Those skilled in the art could easily understand that the illustrated aspects according to the present invention can be further changed without departing from the spirit of the present invention.

BRIEF DESCRIPTION OF DRAWINGS

Figure 1:
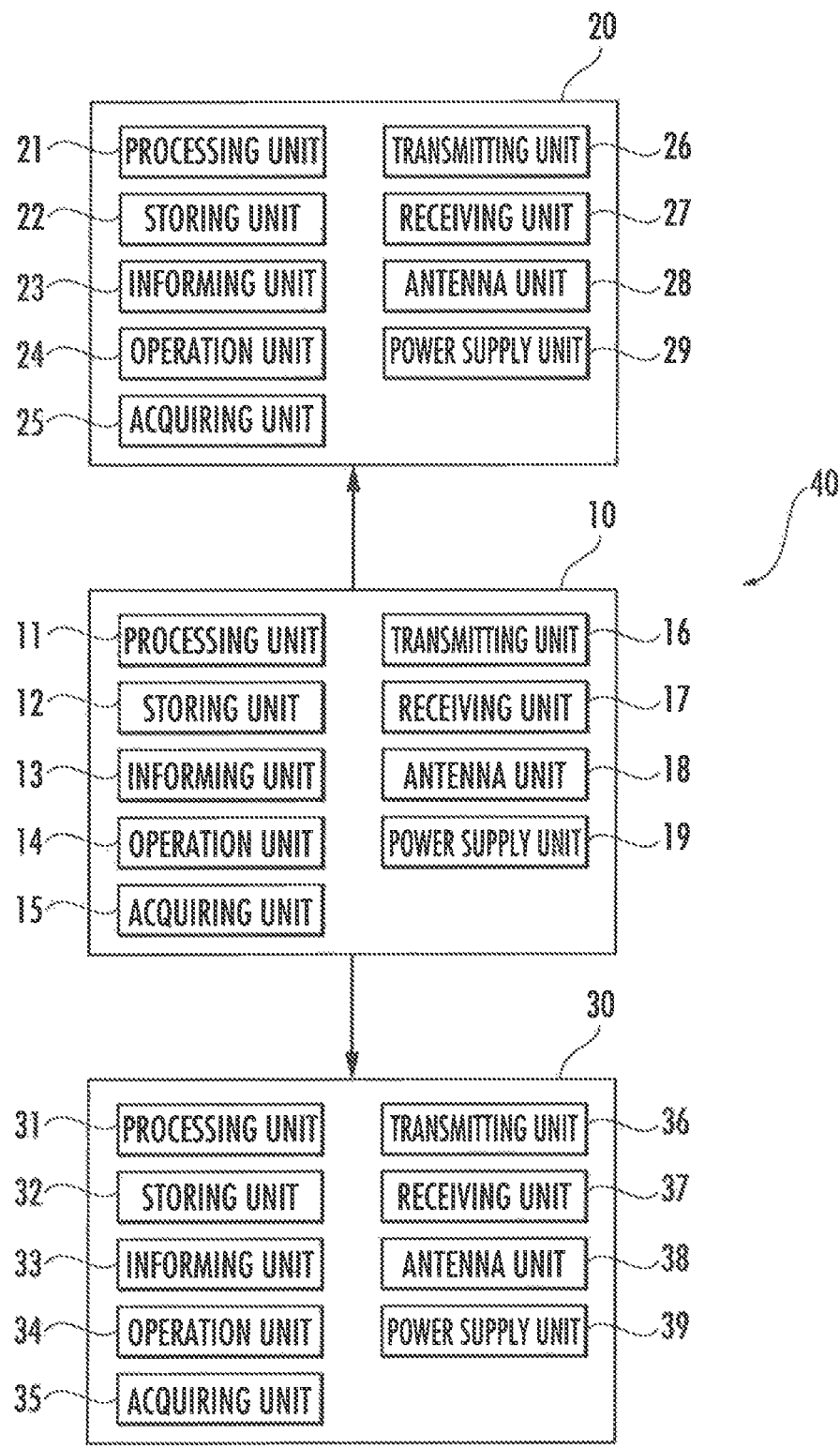

FIG. 1 shows a configuration example of information notification devices or an information notification system according to the present invention.

Each of FIG. 2A and FIG. 2B shows an explanatory diagram of a positional relation between a four-wheeled vehicle and a two-wheeled vehicle.

FIG. 3 shows a configuration example of notification information generated by an information notification device (a third information notification device) of a transmission type.

Figure 4A:
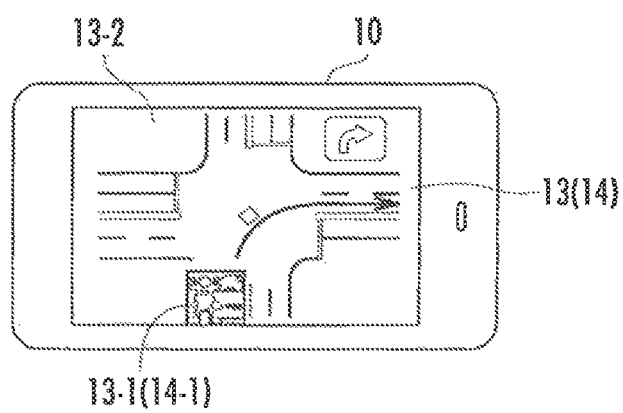
Figure 4B:
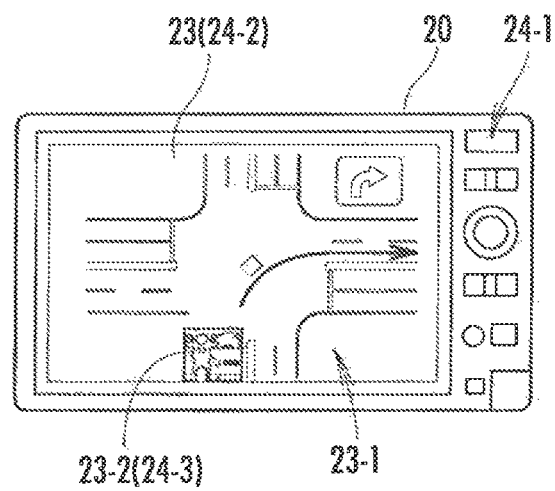
Figure 4C:
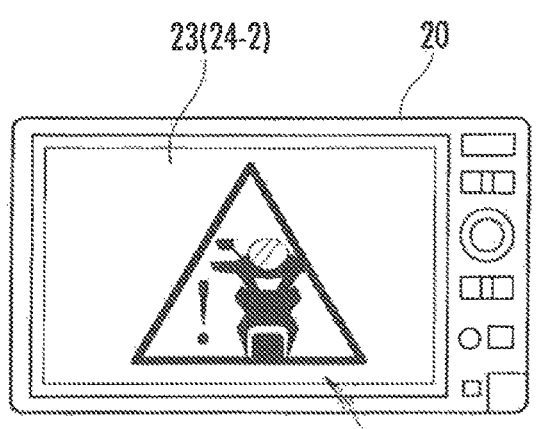
Figure 4D:
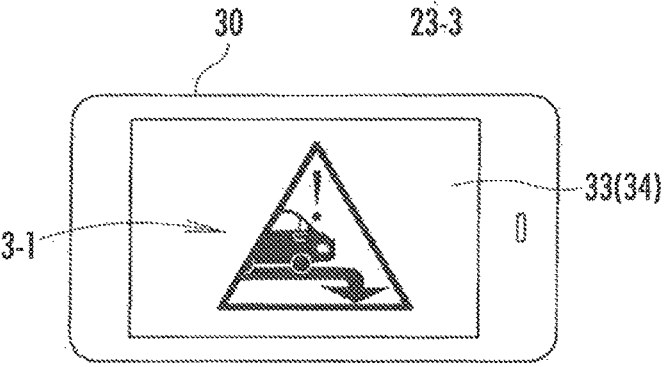

FIG. 4A to FIG. 4D show display examples, in which FIG. 4A shows a display of the information notification device of the transmission type, each of FIG. 4B and FIG. 4C shows a display of an information notification device (a first information notification device) of a reception type, and FIG. 4D shows a display of another information notification device (a second information notification device) of the reception type.

Figure 5:
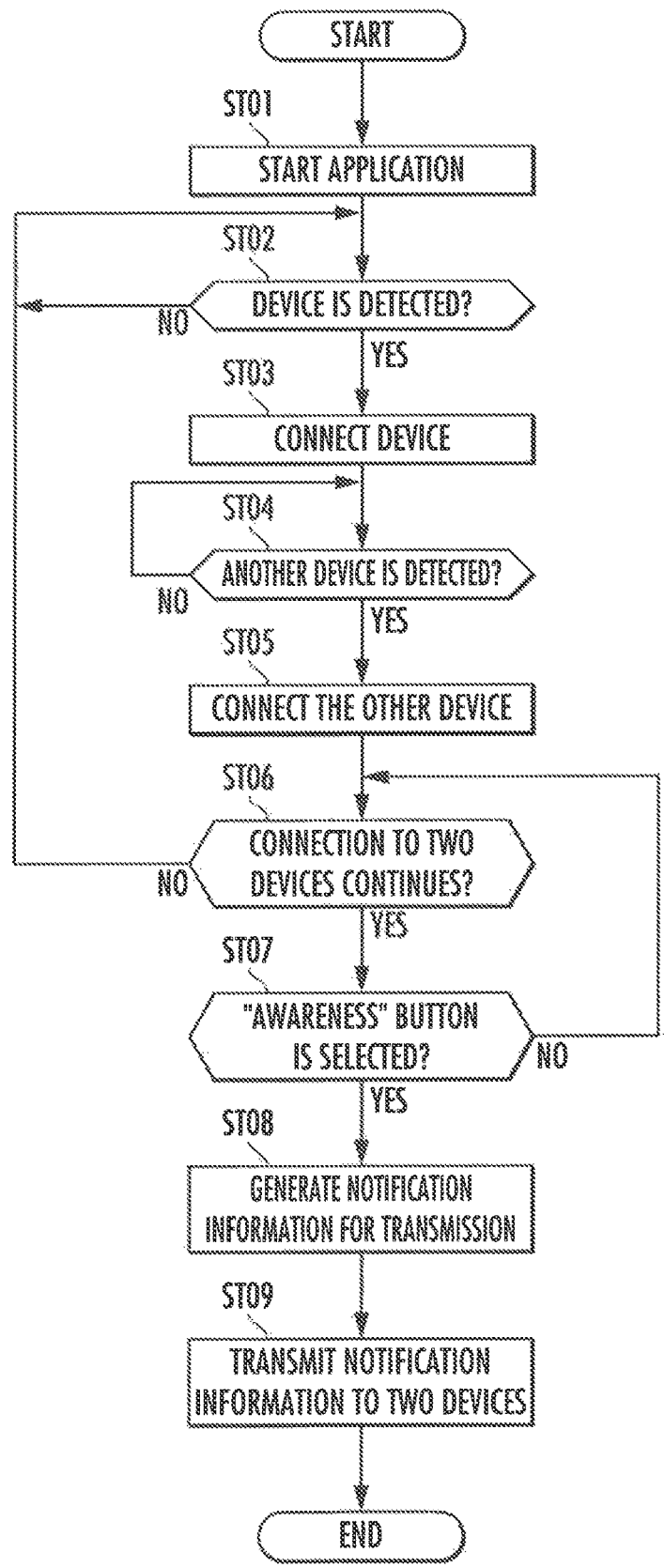

FIG. 5 shows a flowchart representing an operation example of the information notification device of the transmission type.

FIG. 6 shows a flowchart representing an operation example of the information notification device of the reception type.

Figure 7A:
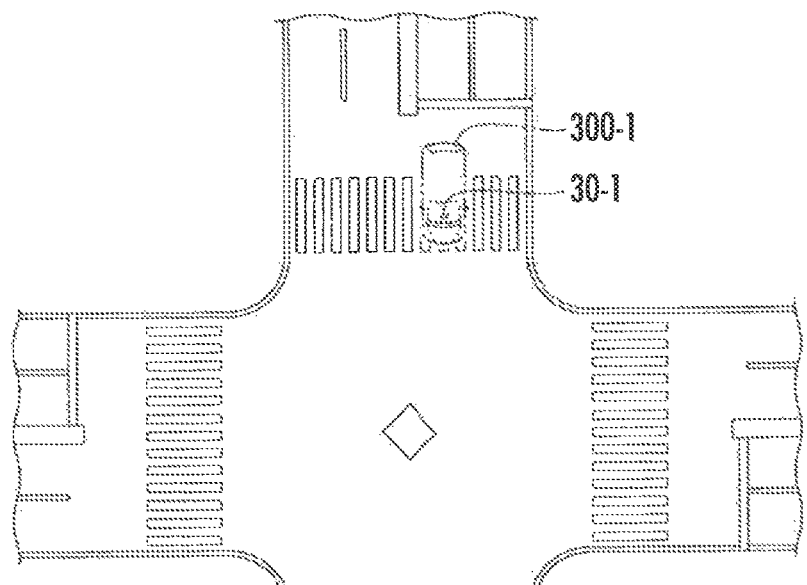
Figure 7B:
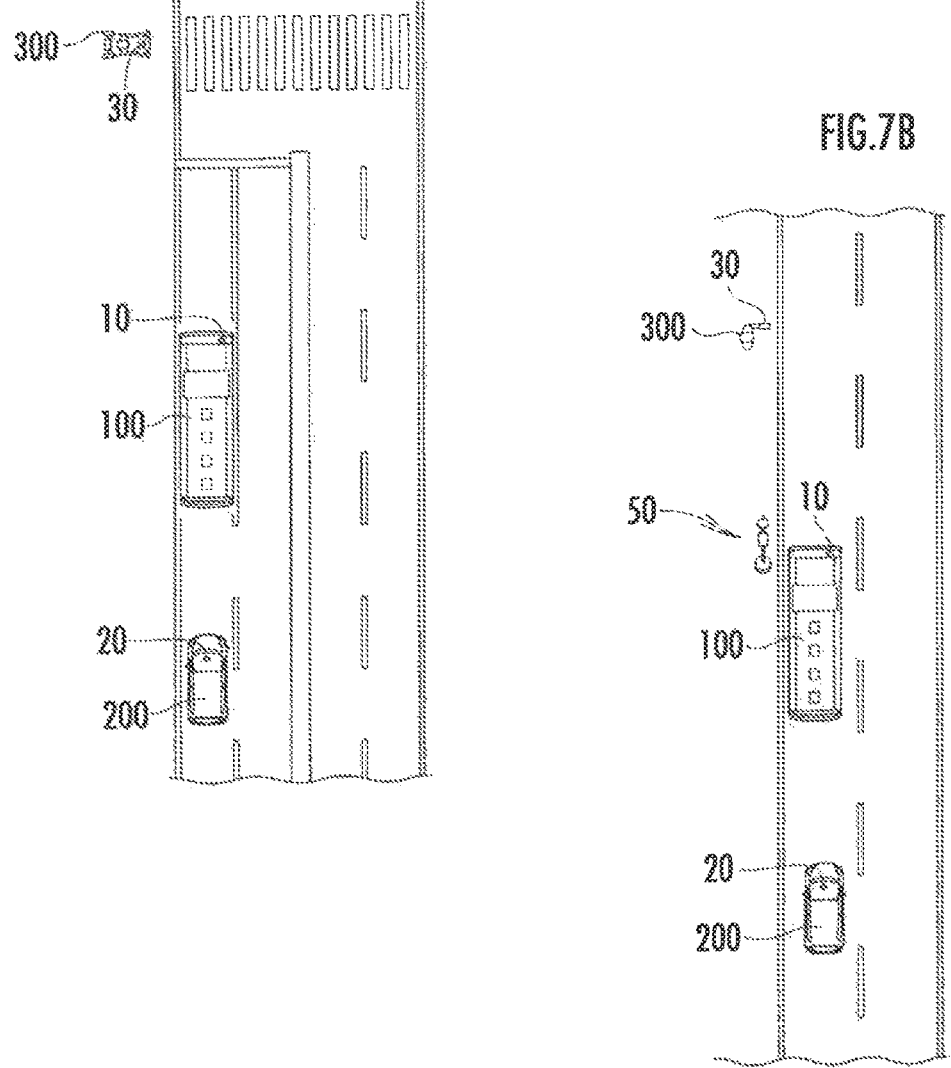

FIG. 7A and FIG. 7B are explanatory diagrams in which FIG. 7A shows a positional relation between the four-wheeled vehicle and an electric cart and FIG. 7B shows a positional relation between the four-wheeled vehicle and a pedestrian.

Figure 8A:
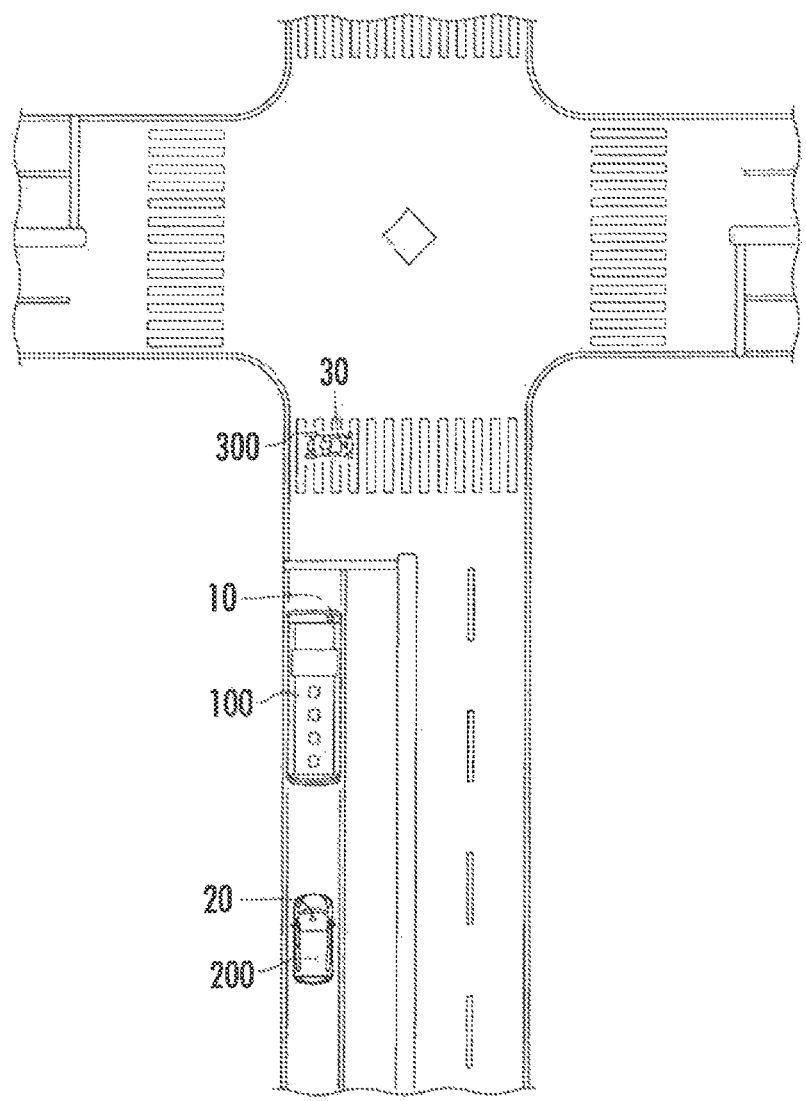
Figure 8B:
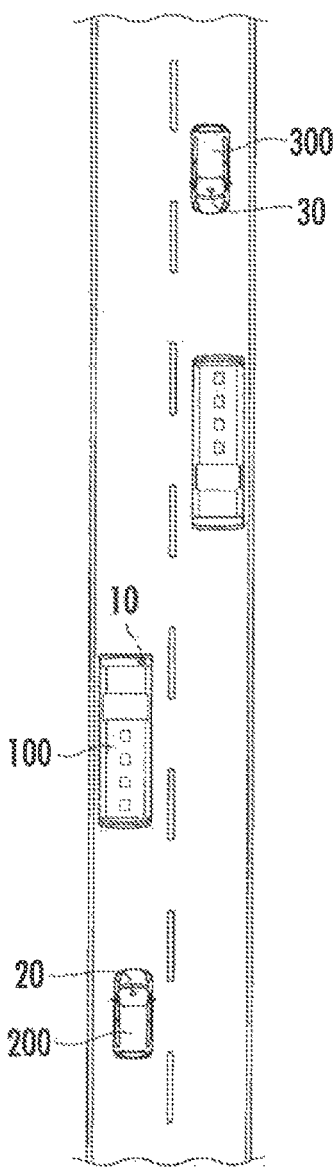

FIG. 8A and FIG. 8B are explanatory diagrams in which FIG. 8A shows another positional relation between the four-wheeled vehicle and the electric cart and FIG. 8B shows a positional relation between the four-wheeled vehicle and a four-wheeled vehicle.

Figure 9A:
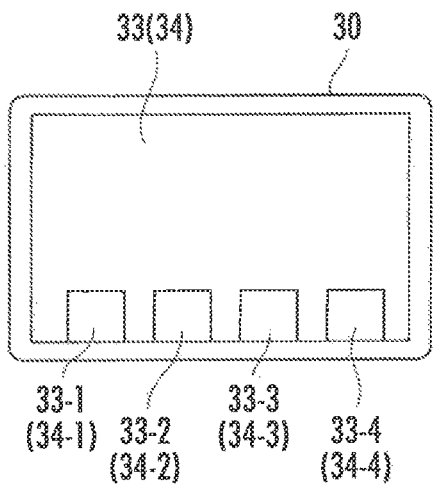
Figure 9B:
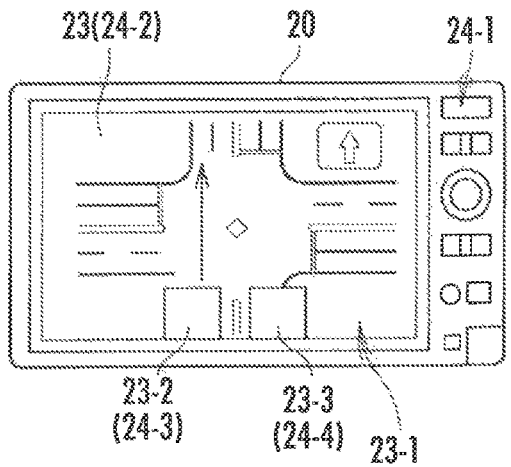
Figure 9C:
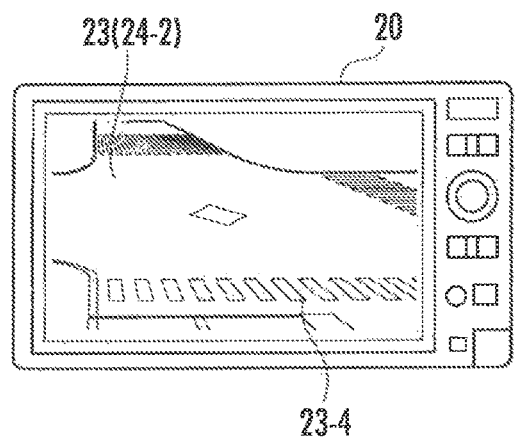
Figure 9D:
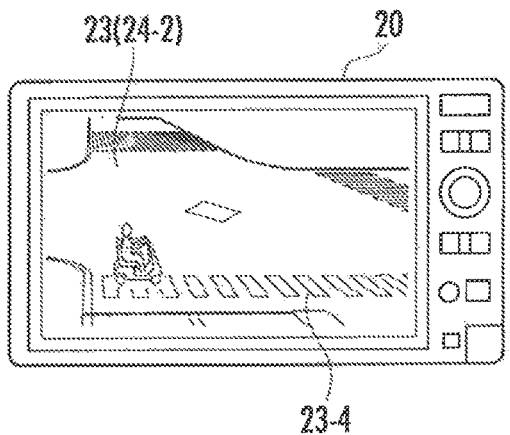
Figure 9E:
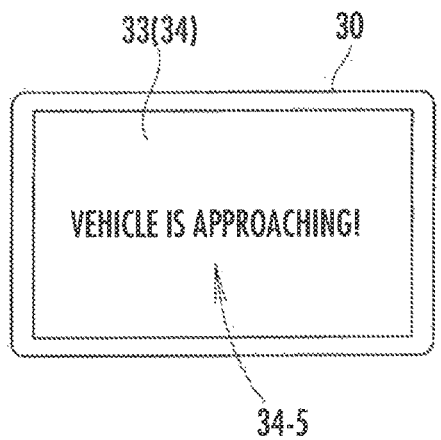

FIG. 9A to FIG. 9E show display examples of a display of the information notification device (the second information notification device) of an active type, each of FIG. 9B, FIG. 9C, and FIG. 9D shows a display example of the display of the information notification device (the first information notification device) of the active type, and FIG. 9E shows another display example of FIG. 9B to FIG. 9D.

FIG. 10 shows a flowchart representing an operation example of the information notification device (the third information notification device) of a passive type.

FIG. 11A and FIG. 11B show flowcharts representing an operation example of the information notification device of the active type.

DESCRIPTION OF EMBODIMENTS

Best embodiments explained below are used in order to easily understand the present invention. Therefore, those skilled in the art should note that the present invention is not unduly limited by the embodiments explained below.

(First Embodiment)

FIG. 1 shows a configuration example of information notification devices or an information notification system according to the present invention. As shown in FIG. 1, an information notification system 40 can be configured by, for example, three information notification devices 10, 20, and 30. However, the information notification system 40 may be configured by, for example, only two information notification devices 10 and 20 or may be configured by four or more information notification devices 10, 20, 30 further including not-shown another information notification device. Each of the three information notification devices 10, 20, and 30 does not have to include all components shown in FIG. 1. Alternatively, not-shown components may be added. In other words, FIG. 1 only shows an illustrative embodiment. At least one component of the information notification devices can be selected or determined according to at least one object of the present invention.

The information notification device 10 shown in FIG. 1 can transmit notification information (see FIG. 3) to the information notification devices 20 and 30. A communication system with which each of the three information notification devices 10, 20, and 30 transmits or receives the notification information may be a line-type radio communication system that uses a line such as the Internet or 3G. However, the communication system is desirably a radio communication system that does not use a line, in particular, a near field radio communication system that does not use a line. The near field radio communication system that does not use a line is, for example, WiFi (wireless fidelity) specified by IEEE802. With the near field communication system such as WiFi that does not use a line, the information notification system 40 does not need to include a server (not shown in the figure) that relays the notification information. In other words, a reaching time of the notification information not through the server is reduced to be shorter than a reaching time of the notification information through the server.

The information notification device 10 shown in FIG. 1 transmits the notification information to the information notification devices 20 and 30. On the other hand, each of the information notification devices 20 and 30 receives the notification information. Therefore, each of the information notification devices 20 and 30 can be referred to as information notification device of a reception type. The information notification device 10 can be referred to as information notification device of a transmission type. Note that, for example, the three information notification devices 10, 20, and 30 form one group.

The information notification device 10 shown in FIG. 1 includes, for example, a processing unit 11 and a transmitting unit 16. The processing unit 11 generates approach information between, for example, a four-wheeled vehicle (an automobile) 200 (see, for example, FIG. 2A) including the information notification device 20 and, for example, a two-wheeled vehicle (a motorcycle) 300 (see, for example, FIG. 2A) including the information notification device 30. The transmitting unit 16 transmits the approach information to both of the four-wheeled vehicle 200 (a receiving unit 27) and the two-wheeled vehicle 300 (a receiving unit 37). Note that the processing unit 11 can add both of first identification information and second identification information (CLASS 20 and CLASS 30 shown in FIG. 3) to approach information (MESSAGE 10 shown in FIG. 3) indicating that the four-wheeled vehicle 200 and the two-wheeled vehicle 300 are approaching each other.

It is assumed that the first identification information is, for example, identification information for one (a first moving body) of two moving bodies approaching each other. The first identification information stored in advance in a storing unit 13 is capable of causing the four-wheeled vehicle 200 (a processing unit 21) to convert the approach information received by the receiving unit 27 into first approach information on the two-wheeled vehicle 300 to the four-wheeled vehicle 200. It is assumed that the second identification information is identification information for the other (a second moving body) of the two moving bodies approaching each other. The second identification information stored in advance in the storing unit 13 is capable of causing the two-wheeled vehicle 300 (a processing unit 31) to convert the approach information received by the receiving unit 37 into second approach information on the four-wheeled vehicle 200 to the two-wheeled vehicle 300. For example, referring to FIG. 2A, the first moving body is the four-wheeled vehicle 200 and the second moving body is the two-wheeled vehicle 300. The processing unit 21 disposed in the four-wheeled vehicle 200 can recognize approach (the first approach information) of the two-wheeled vehicle 300. On the other hand, the processing unit 31 disposed in the two-wheeled vehicle 300 can recognize approach (the second approach information) of the four-wheeled vehicle 200. In this way, a moving body (the first moving body) assumed by the first identification information stored in advance in the storing unit 13 is different from a moving body (the second moving body) assumed by the second identification information stored in advance in the storing unit 13.

An observer such as a driver or a passenger of, for example, a third moving body 100 (for example, a four-wheeled vehicle in FIG. 2A) other than the four-wheeled vehicle 200 (the first moving body) and the two-wheeled vehicle 300 (the second moving body) is sometimes aware of approach between the four-wheeled vehicle 200 and the two-wheeled vehicle 300 early. When such an observer is a user of the information notification device 10, the processing unit 11 of the information notification device 10 can generate approach information and transmit the approach information to both of the four-wheeled vehicle 200 and the two-wheeled vehicle 300.

The information notification device 10 shown in FIG. 1 can further include, for example, an operation unit 14. The operation unit 14 is capable of receiving operation information from the user (the observer). When the user operates (for example, selects, pushes, or clicks) the operation unit 14, the operation information can indicate that the user operates the operation unit 14. The user may operate the operation unit 14 in a contact manner or may operate the operation unit 14 in a non-contact manner by performing a gesture using the body of the user (for example, hanging a hand, a finger, or the like over the operation unit 14 or moving the hand, the finger, or the like). The processing unit 11 can generate approach information according to the operation information from the operation unit 14. Specifically, when the user is aware of approach between the four-wheeled vehicle 200 and the two-wheeled vehicle 300 and thereafter touches, for example, an "awareness" button 14-1 (see FIG. 4A) once, the processing unit 11 can add the first identification information and the second identification information stored in advance in the storing unit 13 to the approach information and generate notification information.

For example, when the user (the observer) is present in a position more desirable than the position of the four-wheeled vehicle 200 (the first moving body) and the position of the two-wheeled vehicle 300 (the second moving body), the user (the observer) can sometimes predict a traffic situation immediately after the present time earlier. Specifically, the user (the observer) present in the desirable position sometimes desires to instantaneously predict that the four-wheeled vehicle 200 and the two-wheeled vehicle 300 will approach more than the four-wheeled vehicle 200 and the two-wheeled vehicle 300 is approaching now and immediately notify the awareness to both of the position of the four-wheeled vehicle 200 and the two-wheeled vehicle 300 approaching each other. At this point, the information notification device 10 of the user (the observer) present in the desirable position includes the first identification information and the second identification information, which are the information concerning both of the four-wheeled vehicle 200 and the two-wheeled vehicle 300 approaching each other, in the approach information and transmits the first identification information and the second identification information. Consequently, the observer (an outsider other than people concerned) can transmit these kinds of information without involving complicated operation. Each of the four-wheeled vehicle (the first moving body) and the two-wheeled vehicle (the second moving body), which receive these kinds of information, can also receive and utilize these kinds of information.

The information notification device 10 shown in FIG. 1 can further include, for example, an acquiring unit 15. The acquiring unit 15 is configured by, for example, a GPS. The GPS may be incorporated in the information notification device 10 or may be disposed on the outside of the information notification device 10. The information notification device 10 shown in FIG. 1 may be a portable terminal (see FIG. 4A) such as a so-called smartphone or a tablet PC or may be a vehicle-mounted device such as a navigation device. When the information notification device 10 is configured by the portable terminal, convenience for the user of the information notification device 10 (the portable terminal) can be improved. Alternatively, when the information notification device 10 is configured by the vehicle-mounted device, any user of the information notification device 10 (the vehicle-mounted device) can use the information notification device 10 (the vehicle-mounted device).

Specifically, when the information notification device 10 is a portable terminal carried into, for example, the interior of, for example, the four-wheeled vehicle 200, the portable terminal (the information notification device 10) may use the GPS incorporated in the portable terminal (the information notification device 10) or may use a GPS incorporated in a navigation device disposed on, for example, a dashboard (an instrument panel) (including a so-called in-dashboard type navigation device (a navigation device built in the inside of the dashboard) and a so-called on-dashboard type navigation device (a navigation device detachably attached to the surface of the dashboard or a smartphone having a navigation application program fixed to the surface of the dashboard via, for example, a cradle)) of, for example, the four-wheeled vehicle 200 or a GPS incorporated in the periphery of the dashboard (a peripheral vehicle-mounted device). The portable terminal (the information notification device 10) is desirably connected to the navigation device by wire or radio. Consequently, the portable terminal (the information notification device 10) can use position information having high accuracy. An antenna unit 18 (a portable terminal) shown in FIG. 1 may incorporate a GPS antenna.

Alternatively, when the information notification device 10 is a navigation device disposed on, for example, a dashboard of, for example, the automobile (the four-wheeled vehicle 200), the navigation device (the information notification device 10) can use a GPS incorporated in, for example, the navigation device (the information notification device 10). A GPS antenna (the antenna unit 18) may be connected to, for example, the navigation device (the information notification device 10) and disposed on, for example, a windshield of the four-wheeled vehicle 200.

The information notification device 10 shown in FIG. 1 can further include, for example, a storing unit 12. The storing unit 12 may function as a work region for temporarily storing information or data at the time when the processing unit 11 executes various kinds of processing or may function as a region in which an information notification application program (an information notification program) for causing the processing unit 11 (a computer) to execute various kinds of processing (an information notification method) is installed or stored. Such a storing unit 12 is configured by, for example, a memory such as a RAM, an EEPROM, or an SSD or a disk such as a HDD. Note that the information notification application program (the information notification program) may be installed or copied in the storing unit 12 from a recording medium (for example, an FDD, an SD card, or a USB memory) that records or stores the information notification application program (the information notification program) and is readable by the computer (the processing unit 11). Naturally, in a state in which such a recording medium is inserted into or mounted on the information notification device 10, the processing unit 11 (the computer) may execute the information notification application program (the information notification program) stored in the recording medium.

The storing unit 12 may further store a navigation application program (a navigation program) for guiding the four-wheeled vehicle 200 to a destination through a traveling route. The processing unit 11 (the computer) can execute the navigation application program (the navigation program).

The information notification device 10 shown in FIG. 1 can further include, for example, an informing unit 13. The informing unit 13 is configured by, for example, a display and a speaker. The informing unit 13 can inform of or output, to the user, information or data at the time when the processing unit 11 executes various kinds of processing. Note that, when the information notification device 10 includes, for example, a touch panel-type display, the touch panel-type display functions as the informing unit 13 (the display) and the operation unit 14 (a software button). In addition, when the operation unit 14 has motion recognition for recognizing a gesture motion of the user, the operation unit 14 configured by, for example, a camera can be disposed, for example, around the display.

The information notification device 10 shown in FIG. 1 can further include, for example, a receiving unit 17. The receiving unit 17 can receive information or data. The receiving unit 17 and the transmitting unit 16 form a communication unit. The communication unit is configured by a WiFi Direct module, a Bluetooth (registered trademark) module, a cellular phone module, a USB module, and the like. The antenna unit 18 includes, for example, an antenna for transmission and an antenna for reception. When the communication unit 18 includes a plurality of modules, the antenna unit 18 may be an antenna that can be shared by the plurality of modules or may be a plurality of antennas respectively usable by modules corresponding thereto among the plurality of modules. A range or breadth of a communication area of the communication unit depends on, for example, the ability of the antenna unit 18 and power (power consumption) of the transmitting unit 16 that determines the intensity of a radio wave output via the antenna unit 18.

The information notification device 10 shown in FIG. 1 can further include, for example, a power supply unit 17. The power supply unit 17 is configured by, for example, a battery and a transformer. When the information notification device 10 is a portable terminal, the portable terminal (the information notification device 10) can incorporate, for example, a lithium ion battery. The components such as the processing unit 11 and the transmitting unit 16 can operate with a power supply of the lithium ion battery. When the information notification device 10 is a vehicle-mounted device, the vehicle-mounted device (the information notification device 10) can incorporate a transformer that converts a power supply voltage of a vehicle battery or a power supply voltage of an ACC into an operating voltage for the components such as the processing unit 11 and the transmitting unit 16.

Each of the information notification devices 20 and 30 shown in FIG. 1 can include a configuration same as the configuration of the information notification device 10. The information notification devices 20 and 30 can be started by electric power from power supply units 29 and 39. However, the information notification devices 20 and 30 operate, for example, as explained below. The information notification devices 20 and 30 can receive the approach information, the first identification information, the second identification information, and the like from the information notification device 10 with, for example, receiving units 27 and 37 and antenna units 28 and 38. The information notification devices 20 and 30 can process the approach information with, for example, processing units 21 and 31 and storing units 22 and 32 and inform the user (for example, a driver of the four-wheeled vehicle 200 or a driver of the two-wheeled vehicle 300) of the processed approach information with, for example, informing units 23 and 33.

Each of FIG. 2A and FIG. 2B shows an explanatory diagram of a positional relation between the four-wheeled vehicle 200 and the two-wheeled vehicle 300. For example, as shown in FIG. 2A, the information notification device 10 shown in FIG. 1 is disposed, for example, on the inside of the third moving body 100 (the intermediate moving body), which is a four-wheeled vehicle, other than the four-wheeled vehicle 200 (the first moving body) and the two-wheeled vehicle 300 (the second moving body). The information notification device 10 is located between the four-wheeled vehicle 200 and the two-wheeled vehicle 300. The third moving body 100 and the four-wheeled vehicle 200 are opposed to each other across an intersection. In FIG. 2A, a lane where the four-wheeled vehicle 200 is located is adjacent to two lanes (portions located ahead of the intersection) where the two-wheeled vehicle 300 and the third moving body 100 are located. However, the four-wheeled vehicle 200, the two-wheeled vehicle 300, and the third moving body 100 may be located, for example, on a single lane.

In FIG. 2A, the four-wheeled vehicle 200 is located ahead of the third moving body 100 and the two-wheeled vehicle 300 is located behind the third moving body 100. The third moving body 100 is scheduled to, for example, turn right. However, the third moving body 100 is stopped taking into account, for example, a situation in an advancing direction. The four-wheeled vehicle 200 is about to proceed in order to, for example, turn right. For example, the traveling two-wheeled vehicle 300 is about to move straight ahead while keeping a state of the two-wheeled vehicle 300.

An observer such as a driver or a passenger of the third moving body 100 can instantaneously recognize that the four-wheeled vehicle 200 is about to turn right taking into account a situation of the four-wheeled vehicle 200 (for example, a track at slightly earlier time, the present speed of the four-wheeled vehicle 200, and a state of a direction indicator of the four-wheeled vehicle 200). If the observer takes into account a situation of the two-wheeled vehicle 300 (the present speed of the two-wheeled vehicle 300, etc.), the observer can recognize that the two-wheeled vehicle 300 is about to enter an intersection. In addition, if the observer takes into account the situation of the four-wheeled vehicle 200 and the situation of the two-wheeled vehicle 300 (the distance between the four-wheeled vehicle 200 and the two-wheeled vehicle 300, etc.), the observer can predict that the four-wheeled vehicle 200 and the two-wheeled vehicle 300 are likely to approach each other at the intersection. In this way, if the observer takes into account that the two-wheeled vehicle 300 is located behind the third moving body 100, the observer can predict approach to the moving body (i.e., the four-wheeled vehicle 200) other than the two-wheeled vehicle 300 located near the intersection.

When the observer is aware of approach between the four-wheeled vehicle 200 and the two-wheeled vehicle 300, the observer can operate the operation unit 14 shown in FIG. 1. Consequently, the information notification device 10 can transmit approach information indicating such approach, the first identification information, and the second identification information to both of the four-wheeled vehicle 200 and the two-wheeled vehicle 300.

The information notification device 20 disposed on the inside of the four-wheeled vehicle 200 can receive the approach information, the first identification information, and the second identification information from the information notification device 10. Similarly, the information notification device 30 disposed on the inside of the two-wheeled vehicle 300 can receive the approach information, the first identification information, and the second identification information from the information notification device 10.

The information notification device 20 can determine approach from the two-wheeled vehicle 300 to the four-wheeled vehicle 200, that is, approach of the two-wheeled vehicle 300 by referring to, for example, the first identification information. The information notification device 20 can inform the driver of the four-wheeled vehicle 200 of the approach of the two-wheeled vehicle 300. The driver can recognize the presence of the two-wheeled vehicle 300. Therefore, the driver of the four-wheeled vehicle 200 can acquire a traffic situation without involving complicated operation.

Similarly, the information notification device 30 can determine approach from the four-wheeled vehicle 200 to the two-wheeled vehicle 300, that is, approach of the four-wheeled vehicle 200 by referring to, for example, the second identification information. The information notification device 30 can inform the driver of the two-wheeled vehicle 300 of the approach of the four-wheeled vehicle 200. The driver can recognize the presence of the four-wheeled vehicle 200. Therefore, the driver of the two-wheeled vehicle 300 can also acquire a traffic situation without involving complicated operation.

In FIG. 2A, when the third moving body 100 (the information notification device 10) is set as a reference, the four-wheeled vehicle 200 (the information notification device 20) is located ahead of the third moving body 100 (the information notification device 10) and the two-wheeled vehicle 300 (the information notification device 30) is located behind the third moving body 100 (the information notification device 10). In FIG. 2B, when the third moving body 100 (the information notification device 10) is set as the reference, the four-wheeled vehicle 200 (the information notification device 20) is located ahead of the third moving body 100 (the information notification device 10) and the two-wheeled vehicle 300 (the information notification device 30) is located on the left of the third moving body 100 (the information notification device 10). In FIG. 2B, the third moving body 100 is stopped such that the four-wheeled vehicle 200 can turn right. On the other hand, for example, the traveling two-wheeled vehicle 300 is about to move straight ahead while keeping a state the two-wheeled vehicle 300. That is, the speed of the two-wheeled vehicle 300 is higher than the speed of the third moving body 100. The two-wheeled vehicle 300 is about to overtake the third moving body 100. Naturally, the third moving body 100 shown in FIG. 2B may be about to decelerate without stopping. Like the driver of the four-wheeled vehicle 200 shown in FIG. 2A, the driver of the four-wheeled vehicle 200 shown in FIG. 2B can recognize the presence of the two-wheeled vehicle 300. The driver of the two-wheeled vehicle 300 shown in FIG. 2B can recognize the presence of the four-wheeled vehicle 200.

In each of FIG. 2A and FIG. 2B, each of the driver of the four-wheeled vehicle 200 and the driver of the two-wheeled vehicle 300 can recognize, according to awareness of the observer (the user of the information notification device 10), what the driver should more beware of.

FIG. 3 shows a configuration example of notification information generated by the information notification device 10 (the third information notification device) of the transmission type. As shown in FIG. 3, the notification information transmitted from the information notification device 10 (the third information notification device) to the information notification devices 20 and 30 (first and second information notification devices) includes, for example, approach information MESSAGE 10 indicating that the four-wheeled vehicle 200 and the two-wheeled vehicle 300 shown in FIG. 2A approach each other, first identification information CLASS 20 representing a type of the four-wheeled vehicle 200 (the first moving body), and second identification information CLASS 30 representing a type of the two-wheeled vehicle 300 (the second moving body). As an example, the type is one of "four-wheeled vehicle" and "two-wheeled vehicle". For example, the "four-wheeled vehicle" is registered in advance in the first identification information CLASS 20. For example, the "two-wheeled vehicle" is registered in advance in the second identification information CLASS 30. Therefore, the notification information configured by the approach information MESSAGE 10, the first identification information CLASS 20, and the second identification information CLASS 30 can represent approach between the "four-wheeled vehicle" and the "two-wheeled vehicle".

In addition, the processing unit 11 of the information notification device 10 can include a sender information ID 10 representing a sender of the notification information. The sender information ID 10 is, for example, a peculiar ID (for example, an IP address, a MAC address, or a login ID) allocated to the information notification device 10. Naturally, the processing unit 11 may include, in the notification information, receiver information (not shown in the figure) representing a receiver of the notification information. In other words, the information notification device 10 may transmit the notification information in a broadcast form or may transmit the notification information in a multicast form.

When sending the notification information, the information notification device 10 may include, in the notification information, situation information STATE 10 representing a situation of the information notification device 10. The situation information STATE 10 is, for example, the position of the information notification device 10. Naturally, the information notification device 10 may include, in the notification information, situation information (not shown in the figure) representing a situation of the four-wheeled vehicle 200 and situation information (not shown in the figure) representing a situation of the two-wheeled vehicle 300 configured by, for example, the positions of the receivers (the four-wheeled vehicle 200 and the two-wheeled vehicle 300) of the notification information.

FIG. 4A shows a display example of a display of the information notification device 10 (the third information notification device) of the transmission type. Each of FIG. 4B and FIG. 4C shows a display example of a display of the information notification device 20 (the first information notification device) of the reception type. FIG. 4D shows a display example of a display of another information notification device 30 (the second information notification device) of the reception type. FIG. 5 shows a flowchart representing an operation example of the information notification device 10 of the transmission type. FIG. 6 shows a flowchart representing an operation example of the information notification devices 20 and 30 of the reception type. The operation of the information notification system 40 configured by, for example, the three information notification devices 10, 20, and 30 is explained below with reference to the drawings. Note that the information notification device 10 of the transmission type may be an information notification device exclusive for the transmission type or may be an information notification device of a transmission and reception type. Similarly, each of the information notification devices 20 and 30 of the reception type may be an information notification device exclusive for the reception type or may be an information notification device of the transmission and reception type.

The user of the information notification device 10 (the outsider other than the people concerned) executes an integrated application program and starts an integrated application by touching, for example, an icon (not shown in the figure) of the integrated application program with a hand of the user (step ST01 in FIG. 5). The integrated application program is created by, for example, integrating an information notification application program with a navigation application program. In other words, the information notification device 10 can use an information notification application (an information notification function) on a navigation application. Naturally, in step ST01 in FIG. 5, the information notification device 10 may execute a single information notification application and execute only the information notification application.

Subsequently, the information notification device 10 can determine whether or not a device is detected (step ST02 in FIG. 5). On the other hand, the user of the information notification device 20 (one of the people concerned) turns on a power supply of the information notification device 20 by, for example, turning on, with a hand of the user, an ignition switch of the four-wheeled vehicle 200 in which the information notification device 20 is disposed. Consequently, the information notification device 20 automatically executes, for example, an integrated application program of the information notification device 20 and automatically starts an integrated application (step ST21 in FIG. 6). Naturally, in step ST21 in FIG. 6, the user of the information notification device 20 may start the integrated application by touching an icon (not shown in the figure) of the integrated application program with the hand of the user. Subsequently, the information notification device 20 can determine whether or not a device is detected (step ST02 in FIG. 6).

For example, when the integrated application of the information notification device 10 and the integrated application of the information notification device 20 are operating, the information notification device 10 can detect the information notification device 20 as a device and connect the information notification device 20 to the information notification device 10 (step ST02 in FIG. 5). Similarly, the information notification device 20 can detect the information notification device 10 as a device and connect the information notification device 10 to the information notification device 20 (step ST23 in FIG. 6).

Subsequently, the information notification device 10 can determine whether or not another device is detected (step ST04 in FIG. 5). On the other hand, the user of the information notification device 30 (the other of the people concerned) turns on a power supply of the information notification device 30 with a hand of the user. Consequently, the information notification device 30 executes, for example, the integrated application program of the information notification device 20 and starts the integrated application (step ST21 in FIG. 6). When the integrated application of the information notification device 30 is also operating, the information notification device 10 can detect the information notification device 30 as another device and connect the information notification device 30 to the information notification device 10 (step ST05 in FIG. 5).

Subsequently, the information notification device 10 can determine whether or not the connection to the two devices (the information notification devices 20 and 30) continues (step ST06 in FIG. 5). Similarly, each of the information notification device 20 and the information notification device 30 can determine whether or not the connection to the device (the information notification device 10) continues (step ST24 in FIG. 6).

Incidentally, as shown in FIG. 4A, the integrated application of the information notification device 10 displays an execution screen of the integrated application on the display of the information notification device 10. The display has not only a function of the informing unit 13 but also a function of the operation unit 14 (the software button). The display shown in FIG. 4A displays an icon 13-1 representing approach between the "four-wheeled vehicle" and the "two-wheeled vehicle". The icon 13-1 is selectable for the user. The icon 13-1 can be referred to as "awareness" button 14-1 capable of transmitting notification information. That is, when the user touches the icon 13-1 (the "awareness" button 14-1) with the hand of the user, the information notification device 10 can generate notification information for transmission and transmit the notification information to the two devices (steps ST07 to ST09 in FIG. 5).

However, the information notification device 10 may omit step ST06 of FIG. 5. That is, when only communication between the information notification device 10 and, for example, the information notification device 20 is established and communication between the information notification device 10 and, for example, the information notification device 30 is disconnected, the information notification device 10 may transmit the notification information for transmission to only one device (the information notification device 20). In other words, after the communication between the information notification device 10 and, for example, the information notification device 30 is temporarily disconnected, when the communication between the information notification device 10 and, for example, the information notification device 30 is restored, the information notification device 10 may transmit the notification information for transmission to only the other device (the information notification device 30). Alternatively, for example, when the user of the two-wheeled vehicle 300 (the other of the people concerned) does not have the information notification device 30, the information notification device 10 may transmit the notification information for transmission to only one device (the information notification device 20).

In addition, the display shown in FIG. 4A can display a navigation screen 13-2 as the execution screen of the integrated application. As explained above, the third moving body 100 shown in FIG. 2A is scheduled to, for example, turn right. However, the third moving body 100 is stopped taking into account, for example, a situation in an advancing direction. Therefore, the navigation screen 13-2 shown in FIG. 4A can superimpose and display an arrow representing a traveling route and an arrow representing a right turn on a map.

Before the information notification device 20 receives the notification information, as shown in FIG. 4B, the integrated application of the information notification device 20 displays the execution screen of the integrated application on the display of the information notification device 20. The operation unit 24 of the information notification device 20 can include a plurality of hardware buttons 24-1 capable of operating, for example, the integrated application and a software button 24-2 configured by, for example, a display. Naturally, the information notification device 20 does not have to include, for example, the plurality of hardware buttons 24-1. Alternatively, the information notification device 20 does not have to include, for example, the software button 24-2.

The display shown in FIG. 4B includes not only a function of the software button 24-2 but also a function of the informing unit 23. The display shown in FIG. 4B can display a navigation screen 23-1 as the execution screen of the integrated application. As explained above, the four-wheeled vehicle 200 shown in FIG. 2A is about to move forward in order to, for example, turn right. Therefore, the navigation screen 23-1 shown in FIG. 4B can superimpose and display an arrow representing a traveling route and an arrow representing a right turn on a map.

In the integrated application of the information notification device 20, as in the integrated application of the information notification device 10, the display shown in FIG. 4B displays an icon 23-2 representing approach between the "four-wheeled vehicle" and the "two-wheeled vehicle". The icon 24-2 is selectable for the user of the information notification device 20. That is, in FIG. 2A, the information notification device 10 of the four-wheeled vehicle 100 transmits the notification information to the four-wheeled vehicle 200 (the information notification device 20) and the two-wheeled vehicle 300 (the information notification device 30) according to awareness of the user of the information notification device 10. However, in not-shown another traffic situation, the information notification device 20 is capable of transmitting, according to awareness of the user of the information notification device 20, another kind of notification information including approach information on another four-wheeled vehicle and another two-wheeled vehicle not shown in the figures to the other four-wheeled vehicle and the other two-wheeled vehicle. Naturally, the integrated application of the information notification device 20 does not have to display the icon 23-2 (an "awareness" button 24-3) representing the approach between the "four-wheeled vehicle" and the "two-wheeled vehicle". In other words, the information notification device 20 may be an information notification device exclusively for the reception type.

When the information notification device 20 shown in FIG. 2A receives the notification information from the information notification device 10, the information notification device 20 can generate approach information for the information notification device 20 from the notification information and display the approach information (steps ST25 to ST27 in FIG. 6). That is, when the information notification device 20 receives the notification information from the information notification device 10, the execution screen of the integrated application is switched from FIG. 4B to FIG. 4C. The display shown in FIG. 4C displays an icon 23-3 representing approach of the "two-wheeled vehicle". Naturally, when the information notification device 20 receives the notification information from the information notification device 10, the display shown in FIG. 4B may display approach information such as the icon 23-3 shown in FIG. 4C instead of the icon 23-2 or in addition to the icon 23-2. In addition, when the information notification device 20 receives the notification information from the information notification device 10, a speaker (not shown in the figure) configuring the informing unit 23 may output sound representing the approach information.

In step ST26 in FIG. 6, specifically, the information notification device 20 determines whether or not the four-wheeled vehicle 200 corresponds to the first identification information CLASS 20 included in the notification information. In the storing unit 22 of the information notification device 20, the "four-wheeled vehicle" is stored in advance as a type of the four-wheeled vehicle 200. When the "four-wheeled vehicle" registered in advance in the first identification information CLASS 20 coincides with the "four-wheeled vehicle" stored in advance in the storing unit 22, the information notification device 20 can inform of the approach information (the icon 23-3 shown in FIG. 4C) representing the "two-wheeled vehicle". In the storing unit 22 of the information notification device 20, the "two-wheeled vehicle" is stored in advance as a type of the opposite vehicle.

However, the storing unit 22 does not have to store the "two-wheeled vehicle" in advance. That is, desirably, the information notification device 20 can refer to the first identification information CLASS 20 and refer to the second identification information CLASS 30 as well. Subsequently, when the "four-wheeled vehicle" registered in advance in the first identification information CLASS 20 coincides with the "four-wheeled vehicle" stored in advance in the storing unit 22, the information notification device 20 can extract, from the notification information, a type (the "two-wheeled vehicle") of the second identification information CLASS 30 not coinciding with the "four-wheeled vehicle" stored in advance in the storing unit 22 and inform of the extracted approach information (the icon 23-3 shown in FIG. 4C) (steps ST26 to ST27 in FIG. 6).

Similarly, when the information notification device 30 shown in FIG. 2A receives the notification information from the information notification device 10, the information notification device 30 can generate approach information for the information notification device 30 from the notification information and display the approach information (steps ST25 to ST27 in FIG. 6). That is, when the information notification device 30 receives the notification information from the information notification device 10, the execution screen of the integrated application is displayed by, for example, the display shown in FIG. 4D. The display shown in FIG. 4D displays an icon 33-1 representing approach of the "four-wheeled vehicle". Naturally, when the information notification device 30 receives the notification information from the information notification device 10, a speaker (not shown in the figure) configuring the informing unit 33 may output sound representing the approach information.

In step ST26 in FIG. 6, specifically, the information notification device 30 determines whether or not the two-wheeled vehicle 300 corresponds to the second identification information CLASS 30 included in the notification information. In the storing unit 32 of the information notification device 30, the "two-wheeled vehicle" is stored in advance as a type of the two-wheeled vehicle 300. When the "two-wheeled vehicle" stored in advance in the second identification information CLASS 30 coincides with the "two-wheeled vehicle" stored in advance in the storing unit 32, the information notification device 20 can inform of the approach information (the icon 33-1 shown in FIG. 4D) representing the "four-wheeled vehicle". In the storing unit 32 of the information notification device 30, the "four-wheeled vehicle" is stored in advance as a type of the opposite vehicle.

Alternatively, the information notification device 30 can refer to the second identification information CLASS 30 and refer to the first identification information CLASS 20 as well. Subsequently, when the "two-wheeled vehicle" registered in advance in the second identification information CLASS 30 coincides with the "two-wheeled vehicle" stored in advance in the storing unit 32, the information notification device 30 can extract, from the notification information, a type (the "four-wheeled vehicle") of the first identification information CLASS 20 not coinciding with the "two-wheeled vehicle" stored in advance in the storing unit 32 and inform of the extracted approach information (the icon 33-1 shown in FIG. 4D) (steps ST26 to ST27 in FIG. 6).

The display shown in FIG. 4D has not only a function of the informing unit 33 but also a function of the operation unit 34 (the software button). Naturally, the information notification device 30 may include a speaker (not shown in the figure) configuring the informing unit 33 instead of the display or in addition to the display. The information notification device 30 may guide the two-wheeled vehicle 300 to a destination only with sound output from the speaker. Naturally, the integrated application program of the information notification device 30 may be a single information notification application not including a navigation application program.

(Modification)

In the first embodiment, for example, the third moving body 100 shown in FIG. 2A is, for example, a four-wheeled vehicle (a passenger car). In the first embodiment, for example, the first moving body 200 and the second moving body 300 shown in FIG. 2A are respectively, for example, the four-wheeled vehicle (the passenger car) 200 and, for example, the two-wheeled vehicle 300. In the first embodiment, for example, the drivers of the first moving body 200 and the second moving body 300 correspond to the people concerned. On the other hand, the driver of the third moving body 100 corresponds to the outsider (the observer) other than the people concerned. In a modification of the first embodiment, the observer is not always necessary. A machine (the information notification device 10 disposed in the third moving body 100) may be automatically aware of approach between the people concerned.

In addition, in the first embodiment, for example, the processing unit 11 shown in FIG. 1 generates the approach information between, for example, the four-wheeled vehicle 200 including the information notification device 20 and, for example, the two-wheeled vehicle 300 (see, for example, FIG. 2A) including the information notification device 30. In the modification of the first embodiment, the processing unit 11 may generate, for example, presence information representing the presence of the four-wheeled vehicle 200 around the two-wheeled vehicle 300. In other words, the processing unit 11 only has to generate the presence information such as the approach information. In the first embodiment or the modification of the first embodiment, for example, the presence information representing the presence of the four-wheeled vehicle 200 around the two-wheeled vehicle 300 is, for example, the presence information representing the presence of the two-wheeled vehicle 300 around the four-wheeled vehicle 200. Therefore, such presence information can be referred to as common presence information (one kind of presence information).

(Second Embodiment)

In the first embodiment, for example, the third moving body 100 shown in FIG. 2(A) is, for example, a four-wheeled vehicle (a passenger car). In the first embodiment, for example, the first moving body 200 and the second moving body 300 shown in FIG. 2(A) are respectively, for example, the four-wheeled vehicle (the passenger car) 200 and the two-wheeled vehicle 300. In a second embodiment, for example, the third moving body 100 shown in FIG. 7A is, for example, a four-wheeled vehicle (a bus). In the second embodiment, for example, the first moving body 200 and the second moving body 300 shown in FIG. 7A are respectively, for example, the four-wheeled vehicle (the passenger car) 200 and, for example, the electric cart 300.

In addition, in the second embodiment, for example, processing executed by the processing unit 11 (see FIG. 1) of the information notification device 10 of the bus 100 shown in FIG. 7A (for example, addition of both of first identification information and second identification information (CLASS 20 and CLASS 30 shown in FIG. 3) to presence information such as approach information) is not always necessary. Therefore, the processing unit 11 in the second embodiment only has to generate and transmit, for example, the presence information such as the approach information. The second embodiment is explained below.

FIG. 7A shows an explanatory diagram of a positional relation between the four-wheeled vehicle 200 (the first moving body) and, for example, the riding electric cart 300 (the second moving body). FIG. 7B shows an explanatory diagram of a positional relation between the four-wheeled vehicle 200 (the first moving body) and the electric cart 300 (the second moving body). For example, as shown in FIG. 7A, the information notification device 10 shown in FIG. 1 is disposed on the inside of the third moving body 100 (the intermediate moving body), which is, for example, a four-wheeled vehicle, or, for example, a commercial vehicle, or, for example, a large four-wheeled vehicle, or, for example, a bus other than the four-wheeled vehicle 200 (the first moving body) and the electric cart 300 (the second moving body). The information notification device 10 is located between the four-wheeled vehicle 200 and the electric cart 300. The third moving body 100 (the bus 100) and the four-wheeled vehicle 200 and a pedestrian crossing are located on the near side of the pedestrian crossing located in an advancing direction of the bus 100 shown in FIG. 7A (in the downward direction in FIG. 7A). The electric cart 300 is located on a sidewalk on the near side of the pedestrian crossing (in the left direction in FIG. 7A).

In FIG. 7A, the electric cart 300 is located in the advancing direction of the third moving body 100 (the bus 100) (the upward direction in FIG. 7A). The four-wheeled vehicle 200 is located in the opposite direction of the advancing direction of the third moving body 100 (the downward direction in FIG. 7A). The four-wheeled vehicle 200 is scheduled to, for example, move straight forward. However, the four-wheeled vehicle 200 desires to check, for example, an advancing direction of the four-wheeled vehicle 200. In some cases, the four-wheeled vehicle 200 considers overtaking the third moving body 100 taking into account a situation in the advancing direction of the four-wheeled vehicle 200. The electric cart 300 is scheduled to cross the pedestrian crossing. However, the electric cart 300 stays on standby taking into account, for example, the situation in the advancing direction of the electric cart 300. Note that, the third moving body 100, for example, decelerates before entering the pedestrian crossing.

When the electric cart 300 does not come into or less easily comes into the sight of the driver of the four-wheeled vehicle 200 (one of the people concerned) or the driver of the four-wheeled vehicle 200 desires to inform people around the four-wheeled vehicle 200 of the presence of the four-wheeled vehicle 200, the driver of the four-wheeled vehicle 200 can operate the operation unit 24 shown in FIG. 1. Consequently, the information notification device 20 can transmit, to the third moving body 100, request information for requesting presence or absence of presence information (second presence information) such as approach information representing such approach. Similarly, when the four-wheeled vehicle 200 does not come into or less easily comes into the sight of the driver of the electric cart 300 (the other of the people concerned) or when the driver of the electric cart 300 desires to inform people around the electric cart 300 of the presence of the electric cart 300, the driver of the cart 300 can operate the operation unit 34 shown in FIG. 1. Consequently, the information notification device 30 can transmit, to the third moving body 100, request information for requesting presence or absence of presence information (first presence information) such as approach information representing such approach. However, for example, the driver of the electric cart 300 does not have to operate the operation unit 34. For example, the information notification device 30 does not have to transmit the request information.

Note that the electric cart 300 is treated as a pedestrian, for example, under the Road Traffic Law of Japan. Therefore, the driver of the electric cart 300 does not have to carry a driver's license. The people concerned may assume that the electric cart 300 itself or a type of the electric cart 300 is a pedestrian.

When the third moving body 100 receives, for example, two request signals from both of the people concerned, the processing unit 11 of the information notification device 10 of the third moving body 100 can be automatically aware that the four-wheeled vehicle 200 and the electric cart 300 are approaching each other. Thereafter, the processing unit 11 can generate, for example, two kinds of presence information such as approach information indicating that the four-wheeled vehicle 200 and the electric cart 300 are approaching each other.

Incidentally, when the third moving body 100 receives one request signal from, for example, one of the people concerned or one moving body (for example, the four-wheeled vehicle 200), the processing unit 11 of the information notification device 10 of the third moving body 100 can be automatically aware that the four-wheeled vehicle 200 is approaching the periphery of the third moving body 100. In other words, the processing unit 11 can be automatically aware of possibility of approach of the four-wheeled vehicle 200 to something. In FIG. 7A, for example, the electric cart 300 is present around the third moving body. Therefore, the processing unit 11 can be automatically aware of possibility of approach of the four-wheeled vehicle 200 to, for example, the electric cart 300. For example, a four-wheeled vehicle 300-1 can also be present around the third moving body as indicated by a dotted line in FIG. 7A. In other words, although only one information notification device 30 is shown in FIG. 1, the information notification system 40 may be configured by, for example, the information notification devices 10 and 20 and two information notification devices 30 and 30-1. Therefore, the processing unit 11 can transmit, to, for example, the electric cart 300 and the four-wheeled vehicle 300-1, presence information (second presence information) such as approach information indicating possibility of approach of the four-wheeled vehicle 200 (the first moving body) to something (the second moving body) such as the electric cart 300 or the four-wheeled vehicle 300-1. Similarly, the processing unit 11 can transmit, to the four-wheeled vehicle 200, presence information (first presence information) representing, for example, the presence of the electric cart 300 around the four-wheeled vehicle 200.

The information notification device 20 of the four-wheeled vehicle 200 can receive the presence information (the first presence information) such as the approach information from the information notification device 10. Therefore, the information notification device 20 can identify or determine possibility of approach from something to the four-wheeled vehicle 200. The information notification device 20 can inform the driver of the four-wheeled vehicle 200 of the possibility of the approach of something. The driver can recognize possibility of the presence of something or, for example, the presence of the electric cart 300. The presence information (the first presence information) is typically an image (see FIG. 9C and FIG. 9D). In this case, the information notification device 20 of the four-wheeled vehicle 200 can receive the image (the first presence information) from the information notification device 10, process the image or keep a state of the image, and display the image.

Similarly, the information notification devices 30 and 30-1 of the electric cart 300, the four-wheeled vehicle 300-1, and the like can receive the presence information (the second presence information) such as the approach information from the information notification device 10. The information notification devices 30 and 30-1 can identify or determine possibility of approach from the four-wheeled vehicle 200 to the electric cart 300, the four-wheeled vehicle 300-1, and the like. The information notification devices 30 and 30-1 can inform the drivers of the electric cart 300, the four-wheeled vehicle 300-1, and the like of possibility of approach of the four-wheeled vehicle 200. The drivers can recognize possibility of the presence of the four-wheeled vehicle 200 or the presence of the four-wheeled vehicle 200. The presence information (the second presence information) is typically information based on request information from the following vehicle (the four-wheeled vehicle 200) following the third moving body 100 (the bus 100). In this case, the information notification device 30 of the electric cart 300 can receive the information (the second presence information) from the information notification device 10, and process the information or keep a state of the information, and display the information.

In FIG. 7A, it is desirable that the third moving body 100 can transmit at least one kind of presence information (for example, the first presence information or the second presence information) on condition that, for example, the third moving body 100 enters a designated area. Alternatively, it is desirable that the third moving body 100 can transmit at least one kind of presence information (for example, the first presence information and the second presence information) on condition that, for example, the third moving body 100 is in a designated state. The designated area is, for example, the periphery of a pedestrian crossing or the periphery of a bus stop. The designated state is, for example, deceleration or a stop.

In FIG. 7A, it is desirable that the four-wheeled vehicle 200 can transmit the request information on condition that, for example, the four-wheeled vehicle 200 enters the designated area. This is because it is possible to suppress or avoid useless transmission. For example, in FIG. 7A, when the four-wheeled vehicle 200 enters the designated area, for example, the third moving body 100, which is a preceding vehicle preceding the four-wheeled vehicle 200, also enters the designated area or the third moving body 100 is present around the designated area.

The information notification device 10 shown in FIG. 1 includes the acquiring unit 15 configured by, for example, a GPS and an acceleration sensor. However, the acquiring unit 15 shown in FIG. 1 is desirably configured by not only, for example, the GPS but also, for example, a camera. In other words, the information notification device 10 shown in FIG. 1 or, for example, the third moving body 100 shown in FIG. 7A desirably further includes, for example, a camera capable of acquiring an image. The camera is, for example, a camera capable of picking up an image of the front of the third moving body 100, for example, a camera of a drive recorder. An image picked up by the camera is likely to represent, for example, the electric cart 300 shown in FIG. 7A located around the third moving body 100. The processing unit 11 of the information notification device 10 can adopt the image from the acquiring unit 15 or the camera as the first presence information (the presence information for one (the first moving body) of the two moving bodies approaching each other). In other words, the third moving body 100 shown in FIG. 7A can transmit the image to, for example, the four-wheeled vehicle 200 as the first presence information.

Note that the processing unit 11 can adopt or use the request information from the four-wheeled vehicle 200 or the first moving body as the second presence information (the presence information for the other (the second moving body) of the two moving bodies approaching each other). In other words, the third moving body 100 shown in FIG. 7A may transmit, as the second presence information, the presence of something (for example, an approaching vehicle such as the four-wheeled vehicle 200) that transmits the request information or possibility of the presence to, for example, the electric cart 300.

In FIG. 7B, for example, the third moving body 100 is stopped in, for example, a bus stop 50. Therefore, for example, the driver of the four-wheeled vehicle 200 desires to check, for example, an advancing direction of the four-wheeled vehicle 200 or an advancing direction of the third moving body 100. In FIG. 7B, the information notification device 30 is, for example, held by a pedestrian 300. The pedestrian 300 is, for example, scheduled to cross a road. In such a situation, for example, trigger information such as the request information is transmitted from the four-wheeled vehicle 200 to the third moving body 100. Taking this as a trigger, the information notification device 10 of the third moving body 100 can transmit the presence information (the second presence information) to, for example, the information notification device 30 of the pedestrian 300. On the other hand, the information notification device 30 can inform the user of the information notification device 30, that is, the pedestrian 300 of the presence information on the four-wheeled vehicle 200 (for example, approach of the four-wheeled vehicle 200 or possibility of the approach).

FIG. 8A shows an explanatory diagram of another positional relation between the four-wheeled vehicle 200 and the electric cart 300. FIG. 8B shows an explanatory diagram of a positional relation between the four-wheeled vehicle 200 and a four-wheeled vehicle 300. The electric cart 300 shown in FIG. 7A stays on standby in the sidewalk in front of the pedestrian crossing (the left side in FIG. 7A). On the other hand, the electric cart 300 shown in FIG. 8A is actually crossing the pedestrian crossing. In such a situation, the driver of the electric cart 300 can transmit the request information to the third moving body 100 beforehand with the information notification device 30. For example, in FIG. 7A, it is likely that the driver of the four-wheeled vehicle 200 cannot recognize the presence of the electric cart 300. Alternatively, for example, in FIG. 7A, it is likely that the driver of the four-wheeled vehicle 200 cannot recognize entry or advance of the electric cart 300 into the pedestrian crossing. Therefore, in FIG. 7A, when the driver of the electric cart 300 desires to inform people around the electric cart 300 of the presence of the electric cart 300 or the entry or the advance of the electric cart 300 into the pedestrian crossing, the driver of the electric cart 300 can transmit the request information to the third moving body 100 before crossing the pedestrian crossing. Note that, when the driver of the four-wheeled vehicle 200 already recognizes the presence of the electric cart 300, the driver of the electric cart 300 may transmit, for example, conversation information serving as the request information to, for example, the four-wheeled vehicle 200 via the third moving body 100.

In FIG. 8B, for example, the driver of the four-wheeled vehicle 300 is likely to consider taking over a preceding vehicle preceding the four-wheeled vehicle 300. In such a situation, for example, the request information is transmitted from the four-wheeled vehicle 200 to the third moving body 100. Taking this as a trigger, the information notification device 10 of the third moving body 100 can transmit the presence information (the first presence information) to, for example, the information notification device 20 of the four-wheeled vehicle 200. On the other hand, the information notification device 20 can inform the driver of the four-wheeled vehicle 200 of approach of the four-wheeled vehicle 300 or possibility of the approach.

Figure 9F:
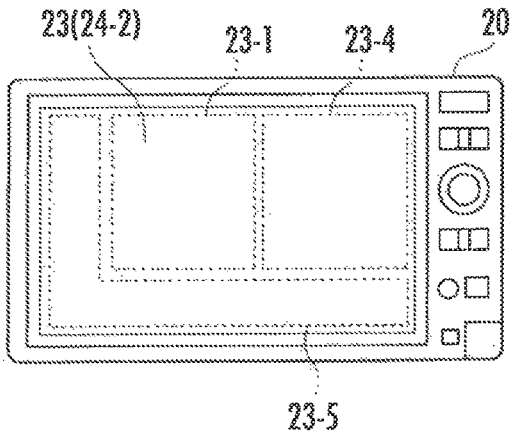

Each of FIG. 9A and FIG. 9E shows a display example of the display of the information notification device 30 (the second information notification device) of an active type. Each of FIG. 9B, FIG. 9C, and FIG. 9D shows a display example of the display of the information notification device 20 (the first information notification device) of the active type. FIG. 9F shows another display example of the display shown in FIG. 9B to FIG. 9D. FIG. 10 shows a flowchart representing an operation example of the information notification device 10 of a passive type. FIG. 11A shows a flowchart representing an operation example of the information notification device 20 (the first information notification device) of the active type. FIG. 11B shows a flowchart representing an operation example of the information notification device 30 (the second information notification device) of the active type. The operation of the information notification system 40 configured by, for example, the three information notification devices 10, 20, and 30 is explained below with reference to the drawings. Note that, for example, the information notification device 30 of the active type may be, for example, an information notification device of the passive type.

The flowcharts of FIG. 10 and FIGS. 11A and 11B are respectively similar to the flowcharts of FIG. 5 and FIG. 6. In other words, steps indicated by the same signs basically represent the same or similar kinds of processing. The user of the information notification device 10 (the outsider other than the people concerned) starts an application such as an integrated application or an information notification application (step ST01 in FIG. 10). The integrated application is created by, for example, integrating the information notification application with a drive recorder application. Subsequently, the information notification device 10 detects, for example, two devices (steps ST02 to ST06 in FIG. 10). When the information notification device 10 is connected to the two devices (the information notification devices 20 and 30), each of the information notification devices 20 and 30 is connected to a device (the information notification device 10) (steps ST21 to ST24 in FIGS. 11A and 11B).

Incidentally, as shown in FIG. 9A, the display of the information notification device 30 displays an execution screen of the application. The display has not only the function of the informing unit 33 but also the function of the operation unit 34 (the software button). The display shown in FIG. 9A displays, for example, the icon 33-1. The icon 33-1 is selectable for the user. The icon 33-1 can be referred to as "request" button 34-1 capable of transmitting the request information. That is, when the user touches the icon 33-1 (the "request" button 34-1) with a hand of the user, the information notification device 30 can generate, for example, request information of a permission type and transmit the request information to the information notification device 10. Note that the "request" button 34-1 capable of generating, for example, the request information of the permission type may be conversation information indicating that, for example, the user of the information notification device 30 (for example, the driver of the electric cart 300 shown in FIG. 7A) desires to, for example, cross the pedestrian crossing now.

However, the information notification device 30 may omit the transmission of the request information or the conversation information. That is, when not receiving, for example, the request information of the permission type, for example, the third moving body 100 or the information notification device 10 shown in FIG. 7A may transmit the presence information (the second presence information) to, for example, the electric cart 300 or the information notification device 30 shown in FIG. 7A. On the other hand, when receiving, for example, request information of an acquisition type from the information notification device 20, for example, the third moving body 100 or the information notification device 10 shown in FIG. 7A may transmit the presence information (the first presence information) to, for example, the four-wheeled vehicle 200 or the information notification device 20 shown in FIG. 7A (step ST07-1 and step ST09 of FIG. 10).

The request information of the acquisition type is generated by, for example, a "request" button 24-3 (the icon 23-2) shown in FIG. 9B. The "request" button 24-3 capable of generating, for example, the request information of the acquisition type can indicate that, for example, the user of the information notification device 20 (for example, the driver of the four-wheeled vehicle 200 shown in FIG. 7A) desires to, for example, expand a visual field. When the user of the information notification device 20 touches the icon 23-2 (the "request" button 24-3) with a hand of the user, the information notification device 20 can generate, for example, the request information of the acquisition type and transmit the request information to the information notification device 10 (step ST25-0 in FIG. 11A). Consequently, the information notification device 10 receives, for example, the request information of the acquisition type from the information notification device 20 (step ST07-1 in FIG. 10). Naturally, when receiving two request signals from the information notification devices 20 and 30, the information notification device 10 may transmit the first presence information and the second presence information to the information notification devices 20 and 30 (step ST09 in FIG. 10).

The information notification device 10 can determine whether or not the request information of the acquisition type is transmitted from a following vehicle (step ST07-1 in FIG. 10). For example, in FIG. 7A, when the four-wheeled vehicle 200, which is the following vehicle, transmits the request information of the acquisition type to the third moving body 100, the information notification device 10 of the third moving body 100 can receive the request information. Specifically, the information notification device 10 can determine, for example, whether or not an advancing direction of the third moving body 100 coincides with an advancing direction of the four-wheeled vehicle 200 (step ST07-1 in FIG. 10). Similarly, for example, in FIG. 8B, the information notification device 10 of the third moving body 100 can receive the request information of the acquisition type from the four-wheeled vehicle 200, which is the following vehicle. On the other hand, in FIG. 8B, the information notification device 10 of the third moving body 100 cannot receive the request information of the acquisition type from the four-wheeled vehicle 300, which is an oncoming vehicle. This is because the advancing direction of the third moving body 100 does not coincide with an advancing direction of the four-wheeled vehicle 300.

For example, in FIG. 7A, when the information notification device 10 of the third moving body 100 receives the request information of the acquisition type from the four-wheeled vehicle 200, the information notification device 10 can acquire an image from the acquiring unit 15 or the camera of the information notification device 10 (step ST07-2 in FIG. 10). The image is, for example, a still image but may be a moving image. Subsequently, the information notification device 10 can adopt the image from the acquiring unit 15 or the camera as the first presence information and can transmit presence information (the first presence information) including the image to the information notification device 20 (steps ST08-1 and ST09 in FIG. 10). Consequently, the information notification device 20 receives the presence information (the first presence information) (step ST25 in FIG. 11A).

The information notification device 10 can adopt the request information of the acquisition type from the four-wheeled vehicle 200 as the second presence information and can transmit the request information (the second presence information) to the information notification device 30 (steps ST08-2 and ST09 in FIG. 10). Consequently, the information notification device 30 receives the presence information (the second presence information) (step ST25 in FIG. 11B).

The information notification device 20 can extract, from the presence information (the first presence information), the image from the acquiring unit 15 or the camera or directly receive the image (the first presence information). For example, in FIG. 7A, the electric cart 300 is likely to be within a blind spot of the camera. When the image from the acquiring unit 15 or the camera does not show the electric cart 300, for example, an extracted image 23-4 (a received image) on the display of the information notification device 30 shown in FIG. 9C does not include the electric cart 300. On the other hand, for example, in FIG. 8A, the electric cart

300 is likely to be within an angle of view of the camera. When the image from the acquiring unit 15 or the camera shows the electric cart 300, for example, the extracted image 23-4 (the received image) on the display of the information notification device 30 shown in FIG. 9D includes the electric cart 300. Consequently, for example, the driver of the four-wheeled vehicle 200 shown in FIG. 8A can easily or immediately recognize the presence of the electric cart 300. Note that, when, for example, 10 seconds elapses from time at a point in time when the display of the image is started, the display may be invalidated. That is, for example, the display of the information notification device 30 shown in FIG. 9C or FIG. 9D may return to, for example, the display shown in FIG. 9B at a point in time when a predetermined period elapses.

The information notification device 20 can extract, from the presence information (the second presence information), the request information of the acquisition type from the information notification device 30 or directly receive the information (the second presence information) based on the request information from the following vehicle (the four-wheeled vehicle 200) following the third moving body 100 (the bus 100). For example, in FIG. 7A, when the electric cart 300 receives the second presence information, for example, an extracted image 34-5 (for example, a generated image or a local image on the information notification device 30 side based on a received text) on the display of the information notification device 30 shown in FIG. 9E can represent the presence of something (for example, an approaching vehicle such as the four-wheeled vehicle 200) that transmits the request information or possibility of the presence. Consequently, for example, the driver of the electric cart 300 shown in FIG. 7A can recognize the presence of the approaching vehicle or possibility of the presence. Note that, for the display of the image, texts such as "vehicle is approaching!", "vehicle is around you!", "beware of approach", and "beware of vehicles around you" can be set. When, for example, 10 seconds elapse from, for example, time at a point in time when the display is started, the display may be invalidated. That is, for example, the display of the information notification device 20 shown in FIG. 9E may return to, for example, the display shown in FIG. 9A at a point in time when a predetermined period elapses.

For example, the display shown in FIG. 9A can display, as an icon 33-2, for example, a "request" button 34-2 capable of generating the request information of the permission type. The "request" button 34-2 can be set to conversation information indicating that, for example, the user of the information notification device 30 (for example, the driver of the electric cart 300 shown in FIG. 8A) desires to cross the pedestrian crossing now. The display shown in FIG. 9A can display, as icons 33-3 and 33-4, for example, "conversation" buttons 34-3 and 34-4 representing another kind of conversation information or conversation information other than the request information. The "conversation" buttons 34-3 and 34-4 can respectively represent, for example, greetings ("hello", "thank you", etc.) and, for example, proposals ("want to take a rest", etc.). The display shown in FIG. 9B can display, as an icon 23-3, for example, a "conversation" button 24-4 representing conversation information. The "conversation" button 24-4 can represent, for example, responses ("hello", "thank you, too", "OK", etc.). Naturally, the "conversation" button 24-4 may represent, for example, greetings and proposals and the "conversation" buttons 34-3 and 34-4 may represent, for example, responses to the greetings and the proposals.

Note that, for example, the display shown in FIG. 9B to FIG. 9D is, for example, a display of a navigation device but may be, for example, a display of a smartphone that can be carried into the interior of the four-wheeled vehicle 200. Alternatively, for example, the display shown in FIG. 9B to FIG. 9D may be realized by the display of the navigation device and the display of the smartphone. For example, the display of the smartphone may be mirror display of the display of the navigation device. Alternatively, any one of buttons and extracted images or both of the display of the navigation device may be displayed on the display of the smartphone.

For example, the display shown in FIG. 9B to FIG. 9D switch the navigation screen 23-1 and the extracted image 23-4 (the received image) on a full screen. However, the display shown in FIG. 9F may display both of the navigation screen 23-1 and the extracted image 23-4 (the received image) side by side. In FIG. 9F, the navigation screen 23-1 is disposed on, for example, the left side of the extracted image 23-4. Naturally, the navigation screen 23-1 may be disposed, for example, on the right side, the lower side, or the upper side of the extracted image 23-4. The extracted image 23-4 (the received image) is equivalent to an image (an acquired image) from the acquiring unit 15 or the camera. For example, the driver of the four-wheeled vehicle 200 shown in FIG. 7A can view the image. The extracted image 23-4 (the received image or the acquired image) may be a still image or may be a moving image.

On the display shown in FIG. 9F, a region 23-5 (a command bar display region) where, for example, the "request" button 24-3 (the icon 23-2) and the "conversation" button 24-4 (the icon 23-3) shown in FIG. 9b are built or displayed can be disposed, for example, around a frame of the display. In FIG. 9F, the region 23-5 is a combination of a longitudinally long region and a laterally long region. However, the region 23-5 may be only the longitudinally long region or the laterally long region. Further, a sound input button, a radio play button, a music play button, and the like not shown in the figure may be disposed in the region 23-5. These buttons can be optionally built or set. The region 23-5 itself is, for example, a widget. These buttons can be freely shown and hidden by, for example, flip operation from the left. Display of any buttons can be switched by slide operation.

Incidentally, for example, the navigation screen 23-1 shown in FIG. 9B (for example, the information notification device 20 of the four-wheeled vehicle 200 shown in FIG. 7A) may display, for example, the position of the electric cart 300 shown in FIG. 7A. Such display is explained below.

The information notification device 20 can transmit, as a connection request to the information notification device 10, an ID 20, which is sender information (first sender information) on the information notification device 20, and a STATE 20, which is presence information representing the position of the information notification device 20, to the information notification device 10 (see step ST03 in FIG. 10). Similarly, the information notification device 30 can transmit, as a connection request to the information notification device 10, an ID 30, which is sender information (second sender information) on the information notification device 30, and a STATE 30, which is presence information representing the position of the information notification device 30, to the information notification device 10 (see step ST05 in FIG. 10). Desirably, the STATE 30 and the STATE 20 are updated, for example, in step ST06 of FIG. 10. Before executing step ST07-1, the information notification device 10 can transmit, for example, the ID 20 and the STATE 20 to the information notification device 30. Similarly, before executing step ST07-1, the information notification device 10 can transmit, for example, the ID 30 and the STATE 30 to the information notification device 20.

For example, the information notification device 20, which receives the ID 30 and the STATE 30, can display, for example, an icon for identifying the ID 30 (the electric cart 300) in, for example, a position equivalent to the STATE 30 on, for example, a map of the navigation screen 23-1 shown in FIG. 9B. Similarly, for example, when an application image shown in FIG. 9A is a navigation screen, the application image (the navigation screen) shown in FIG. 9A may display, for example, the position of the four-wheeled vehicle 200 shown in FIG. 7A. Specifically, for example, the information notification device 30, which receives the ID 20 and the STATE 20, can display, for example, an icon for identifying the ID 20 (the four-wheeled vehicle 200) in, for example, a position equivalent to the STATE 20 on, for example, a map of the application image (the navigation screen) shown in FIG. 9A.

In addition, for example, the navigation screen 23-1 shown in FIG. 9B (for example, the information notification device 20 of the four-wheeled vehicle 200 shown in FIG. 7A) may display, for example, the position of the bus 100 shown in FIG. 7A. Similarly, the application image (the navigation screen) shown in FIG. 9A may display, for example, the position of the bus 100 shown in FIG. 7A. Such display is explained below.

Before executing step ST07-1, the information notification device 10 can transmit, for example, an ID 10 and a STATE 10 to the information notification device 20. For example, the information notification device 20, which receives the ID 10 and the STATE 10, can display, for example, an icon for identifying the ID 10 (the bus 100) in, for example, a position equivalent to the STATE 10 on, for example, the map of the navigation screen 23-1 shown in FIG. 9B. Similarly, before executing steps ST07-1, the information notification device 10 can transmit, for example, the ID 10 and the STATE 10 to the information notification device 30. For example, the information notification device 30, which receives the ID 10 and the STATE 10, can display, for example, an icon for identifying the ID 10 (the bus 100) in, for example, a position equivalent to the STATE 10 on, for example, the map of the application image (the navigation screen) shown in FIG. 9A.

For example, the icon for identifying the ID 10 (the bus 100) or an icon generated anew around the icon may be, for example, a balloon image representing a text (a received text) such as "vehicle is approaching!", "vehicle is around you!", "beware of approach", or "beware of vehicles around you". In other words, such an icon (for example, a balloon image) may be adopted instead of any one of, for example, the extracted image 34-5 on the display of the information notification device 30 shown in FIG. 9E (for example, a generated image or a local image on the information notification device 30 side based on the received text) and/or, for example, the extracted image 23-4 (the received image) on the display of the information notification device 30 shown in FIG. 9D.

Specifically, when such an icon (for example, a balloon image) is adopted instead of, for example, the extracted image 34-5 on the display of the information notification device 30 shown in FIG. 9E, in step ST08-2, the information notification device 10 can transmit, to the information notification device 30 (a destination), the ID 30 adopting the ID 30, which is the sender information on the connection request, as destination information, the STATE 10 adopting, for example, the position of the information notification device 10 as position information, and a MESSAGE 30 adopting the received text as presence information. Note that the STATE 10 may adopt, for example, the position of the information notification device 20 as the position information.

When such an icon (for example, a balloon image) is not adopted instead of, for example, the extracted image 23-4 (the received image) on the display of the information notification device 30 shown in FIG. 9D, in step ST08-1, the information notification device 10 can transmit, to the information notification device 30 (the destination), the ID 20 adopting the ID 20, which is the sender information on the connection request, as destination information, the STATE 10 adopting, for example, the position of the information notification device 10 as position information, and a MESSAGE 20 adopting a received image as presence information. Note that the STATE 10 may adopt, for example, the position of the information notification device 30 as the position information.

The present invention is not limited to the illustrative embodiments explained above. Those skilled in the art can easily change the illustrative embodiments to a scope included in claims.

REFERENCE SIGNS LIST

10 information notification device (third information notification device)
11 processing unit
14 operation unit
15 acquiring unit
16 transmitting unit
20 information notification device (first information notification device)
21 processing unit
23 informing unit
27 receiving unit
30 information notification device (second information notification device)
31 processing unit
33 informing unit
37 receiving unit
40 information notification system
100 third moving body
200 first moving body (for example, four-wheeled vehicle)
300 second moving body (for example, two-wheeled vehicle or, for example, riding electric cart)
CLASS 10 first identification information
CLASS 30 second identification information
MESSAGE 10, MESSAGE 20, MESSAGE 30 presence information (for example, approach information)

The invention claimed is:

1. An information notification device which directly communicates with each of a first moving body and a second moving body, the information notification device comprising:

a processing unit configured to generate, according to trigger information, at least one presence information; and a transmitting unit configured to transmit the at least one presence information to both of the first moving body and the second moving body according to the trigger information, wherein the at least one presence information is capable of causing a second processing unit of the second moving body to identify presence information representing presence of the first moving body based on the at least one presence information and causing a first processing unit of the first moving body to identify presence information representing presence of the second moving body based on the at least one presence information, the trigger information is request information from the first moving body or request information from the second moving body, and at least one of the request information from the first moving body and the request information from the second moving body is generated by a manual operation by a user, and the information notification device is provided on a third moving body.

2. The information notification device according to claim 1, wherein the information notification device is a portable terminal that can be carried into an interior of a vehicle that is the third moving body.

3. The information notification device according to claim 1, wherein the information notification device is a vehicle-mounted device built in a dashboard of a vehicle or in a periphery of the dashboard, wherein the vehicle is the third moving body.

4. An information notification method comprising:
generating, using an information notification device provided on a third moving body and communicating directly with each of a first moving body and a second moving body, and according to trigger information, at least one presence information between the first moving body and the second moving body; and
transmitting the at least one presence information to both of the first moving body and the second moving body according to the trigger information,
wherein
the at least one presence information is capable of causing a second processing unit of the second moving body to identify presence information representing presence of the first moving body based on the at least one presence information and causing a first processing unit of the first moving body to identify presence information representing presence of the second moving body based on the at least one presence information, the trigger information is request information from the first moving body or request information from the second moving body, and at least one of the request information from the first moving body and the request information from the second moving body is generated by a manual operation by a user.

5. An information notification program for causing a computer to execute:
generating, using an information notification device provided on a third moving body and communicating directly with each of a first moving body and a second moving body, and according to trigger information, at least one presence information between the first moving body and the second moving body; and
transmitting the at least one presence information to both of the first moving body and the second moving body according to the trigger information,
wherein
the at least one presence information is capable of causing a second processing unit of the second moving body to identify presence information representing presence of the first moving body based on the at least one presence information and causing a first processing unit of the first moving body to identify presence information representing presence of the second moving body based on the at least one presence information, the trigger information is request information from the first moving body or request information from the second moving body, and at least one of the request information from the first moving body and the request information from the second moving body is generated by a manual operation by a user.

* * * * *